(12) United States Patent
Shintani

(10) Patent No.: US 9,497,372 B2
(45) Date of Patent: Nov. 15, 2016

(54) IMAGING DEVICE, IMAGING SYSTEM, COMMUNICATION DEVICE, IMAGING METHOD, AND COMPUTER READABLE RECORDING MEDIUM

(71) Applicant: Olympus Corporation, Shibuya-ku, Tokyo (JP)

(72) Inventor: Koichi Shintani, Hachioji (JP)

(73) Assignee: Olympus Corporation, Tokyo (JP)

( * ) Notice: Subject to any disclaimer, the term of this patent is extended or adjusted under 35 U.S.C. 154(b) by 75 days.

(21) Appl. No.: 14/567,616

(22) Filed: Dec. 11, 2014

(65) Prior Publication Data
US 2015/0172530 A1    Jun. 18, 2015

(30) Foreign Application Priority Data

Dec. 13, 2013    (JP) .................. 2013-258564

(51) Int. Cl.
| | |
|---|---|
| *H04N 5/232* | (2006.01) |
| *H04N 5/77* | (2006.01) |
| *H04N 1/00* | (2006.01) |
| *H04N 1/21* | (2006.01) |
| *H04N 21/2187* | (2011.01) |
| *H04N 21/414* | (2011.01) |
| *H04N 21/4788* | (2011.01) |
| *H04N 21/4223* | (2011.01) |

(52) U.S. Cl.
CPC ...... *H04N 5/23203* (2013.01); *H04N 1/00129* (2013.01); *H04N 1/00307* (2013.01); *H04N 1/215* (2013.01); *H04N 5/772* (2013.01); *H04N 21/2187* (2013.01); *H04N 21/41407* (2013.01); *H04N 21/4223* (2013.01); *H04N 21/4788* (2013.01); *H04N 2201/0075* (2013.01); *H04N 2201/0084* (2013.01)

(58) Field of Classification Search
None
See application file for complete search history.

(56) References Cited

U.S. PATENT DOCUMENTS

2006/0262365 A1*  11/2006  Imao .................. H04N 5/232
                                              358/527

FOREIGN PATENT DOCUMENTS

| JP | 2002-271673 | 9/2002 |
|---|---|---|
| JP | 2003-250079 | 9/2003 |

\* cited by examiner

*Primary Examiner* — Dennis Hogue
(74) *Attorney, Agent, or Firm* — John C. Pokotylo; Straub & Pokotylo

(57) ABSTRACT

An imaging device includes an imaging unit configured to generate plural pieces of image data, a storing unit, a first communication control unit configured to sequentially transmit a newest one of the plural pieces of image data and identification information for identifying the newest one of the plural pieces of image data to plural communication devices and receive the identification information received by an operated communication device and elapsed time information from the operated communication device, and an image selection unit configured to select reproduction priority candidate image data, which is obtainable and reproducible by the operated communication device, from among the plural pieces of image data stored in the storing unit based on the elapsed time information and the identification information received.

11 Claims, 18 Drawing Sheets

IMAGING DEVICE, IMAGING SYSTEM, COMMUNICATION DEVICE, IMAGING METHOD, AND COMPUTER READABLE RECORDING MEDIUM

CROSS-REFERENCE TO RELATED APPLICATIONS

This application is based upon and claims the benefit of priority from Japanese Patent Application No. 2013-258564, filed on Dec. 13, 2013, the entire contents of which are incorporated herein by reference.

BACKGROUND OF THE INVENTION

1. Field of the Invention

The present invention relates to an imaging device for capturing an image of a subject, an imaging system including the imaging device, a communication device used in the imaging system, an imaging method executed by the imaging device, and a computer-readable recording medium.

2. Description of the Related Art

Recently, regarding an imaging device such as a digital camera and a digital camcorder, there is known a technique for displaying a live view image corresponding to image data generated by imaging on a display unit and sequentially transmitting the image data to an external communication device such as a mobile phone using a communication technique (for example, see Japanese Patent Application Laid-open No. 2003-250079; hereinafter, this document is referred to as Patent Document 1).

The technique described in Patent Document 1 is a technique for remote-controlling an imaging device from a communication device.

Concretely, in the technique described in Patent Document 1, the communication device sequentially receives image data transmitted from the imaging device and sequentially displays live view images corresponding to the image data on the display unit. A user of the communication device executes an imaging operation with the communication device at a timing desiring to control the imaging device to record image data as checking the live view images displayed on the display unit of the communication device. In response to this imaging operation, an image data record request is transmitted from the communication device to the imaging device. After receiving the record request, the imaging device generates image data by capturing an image of a subject, records the image data, and transmits the recorded image data to the communication device. In other words, the user of the communication device can obtain desired image data in response to the imaging operation executed with the communication device.

Here, for example, when the imaging device and plural communication devices communicate one another, it is considered that the imaging device and the plural communication devices communicate as follows.

The imaging device transmits image data (live view image) generated by imaging to one of the communication devices and transmits next image data (live view image) generated by imaging to another of the communication devices. In other words, the imaging device sequentially transmits newest image data to the plural communication devices in predetermined order.

As a result, the communication device sequentially receives image data at an interval of a number of frames corresponding to the number of the communication devices that communicate with the imaging device from the pieces of image data which are sequentially captured by the imaging device, and sequentially displays live view images at an interval of the number of frames.

SUMMARY OF THE INVENTION

In accordance with some embodiments, an imaging device, an imaging system, a communication device, an imaging method by the imaging device, and a computer readable recording medium are presented.

In some embodiments, an imaging device includes: an imaging unit configured to sequentially capture images of a subject and generate plural pieces of image data; a storing unit configured to store the plural pieces of image data generated by the imaging unit; a first communication unit configured to be connected to plural communication devices to transmit and receive information thereto and therefrom; a first communication control unit configured to sequentially transmit a newest one of the plural pieces of image data and identification information for identifying the newest one of the plural pieces of image data to the plural communication devices via the first communication unit and receive the identification information received by an operated communication device and elapsed time information from the operated communication device via the first communication unit, the operated communication device being one of the plural communication devices that a user performs an imaging operation, and the elapsed time information being related to elapsed time from a reception of the newest one of the plural pieces of image data and the identification information by the operated communication device until an execution of the imaging operation on the operated communication device; and an image selection unit configured to select reproduction priority candidate image data, which is obtainable and reproducible by the operated communication device, from among the plural pieces of image data stored in the storing unit based on the elapsed time information and the identification information received via the first communication unit.

In some embodiments, an imaging system includes: the imaging device; and plural communication devices configured to be connected to the imaging device to transmit and receive information thereto and therefrom, wherein the communication device including: a second communication unit configured to be connected to the imaging device to transmit and receive information thereto and therefrom; a second communication control unit configured to receive the newest one of the plural pieces of image data and the identification information from the imaging device via the second communication unit; a display unit configured to display an image; a display control unit configured to control the display unit to display an image corresponding to the newest one of the plural pieces of image data received from the imaging device via the second communication unit; an operation accepting unit configured to accept the imaging operation; and an elapsed time measuring unit configured to measure elapsed time from a reception of the newest one of the plural pieces of image data and the identification information from the imaging device via the second communication unit until an acceptance of the imaging operation by the operation accepting unit, wherein, when the operation accepting unit accepts the imaging operation, the second communication control unit transmits elapsed time information related to the elapsed time measured by the elapsed time measuring unit and the identification information to the imaging device via the second communication unit.

In some embodiments, a communication device that is connected to an imaging device for capturing an image of a subject to transmit and receive information thereto and therefrom is presented. The communication device includes: a second communication unit configured to be connected to the imaging device to transmit and receive information thereto and therefrom; a second communication control unit configured to receive image data and identification information for identifying the image data from the imaging device via the second communication unit; a display unit configured to display an image; a display control unit configured to control the display unit to display an image corresponding to the image data received from the imaging device via the second communication unit; an operation accepting unit configured to accept an imaging operation; and an elapsed time measuring unit configured to measure elapsed time from a reception of the image data and the identification information from the imaging device via the second communication unit until an acceptance of the imaging operation by the operation accepting unit, wherein, when the operation accepting unit accepts the imaging operation, the second communication control unit transmits elapsed time information related to the elapsed time measured by the elapsed time measuring unit and the identification information to the imaging device via the second communication unit.

In some embodiments, an imaging method executed by an imaging device that is connected to plural communication devices to transmit and receive information thereto and therefrom is presented. The method includes: generating plural pieces of image data by sequentially capturing images of a subject; sequentially transmitting a newest one of the plural pieces of image data and identification information for identifying the newest one of the plural pieces of image data to the plural communication devices; receiving the identification information received by an operated communication device and elapsed time information from the operated communication device, the operated communication device being one of the plural communication devices that a user performs an imaging operation, and the elapsed time information being related to elapsed time from a reception of the newest one of the plural pieces of image data and the identification information by the operated communication device until an execution of the imaging operation on the operated communication device; and selecting reproduction priority candidate image data, which is obtainable and reproducible by the operated communication device, from among the plural pieces of the image data stored in storing unit based on the elapsed time information and the identification information received.

In some embodiments, a non-transitory computer readable recording medium having an executable program recorded thereon is presented. The program instructs a processor, which is included in an imaging device that is connected to plural communication devices to transmit and receive information thereto and therefrom, to execute: generating plural pieces of image data by sequentially capturing images of a subject; sequentially transmitting a newest one of the plural pieces of image data and identification information for identifying the newest one of the plural pieces of image data to the plural communication devices; receiving the identification information received by an operated communication device and elapsed time information from the operated communication device, the operated communication device being one of the plural communication devices that a user performs an imaging operation, and the elapsed time information being related to elapsed time from a reception of the newest one of the plural pieces of image data and the identification information by the operated communication device until an execution of the imaging operation on the operated communication device; and selecting reproduction priority candidate image data, which is obtainable and reproducible by the operated communication device, from among the plural pieces of the image data stored in storing unit based on the elapsed time information and the identification information received.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
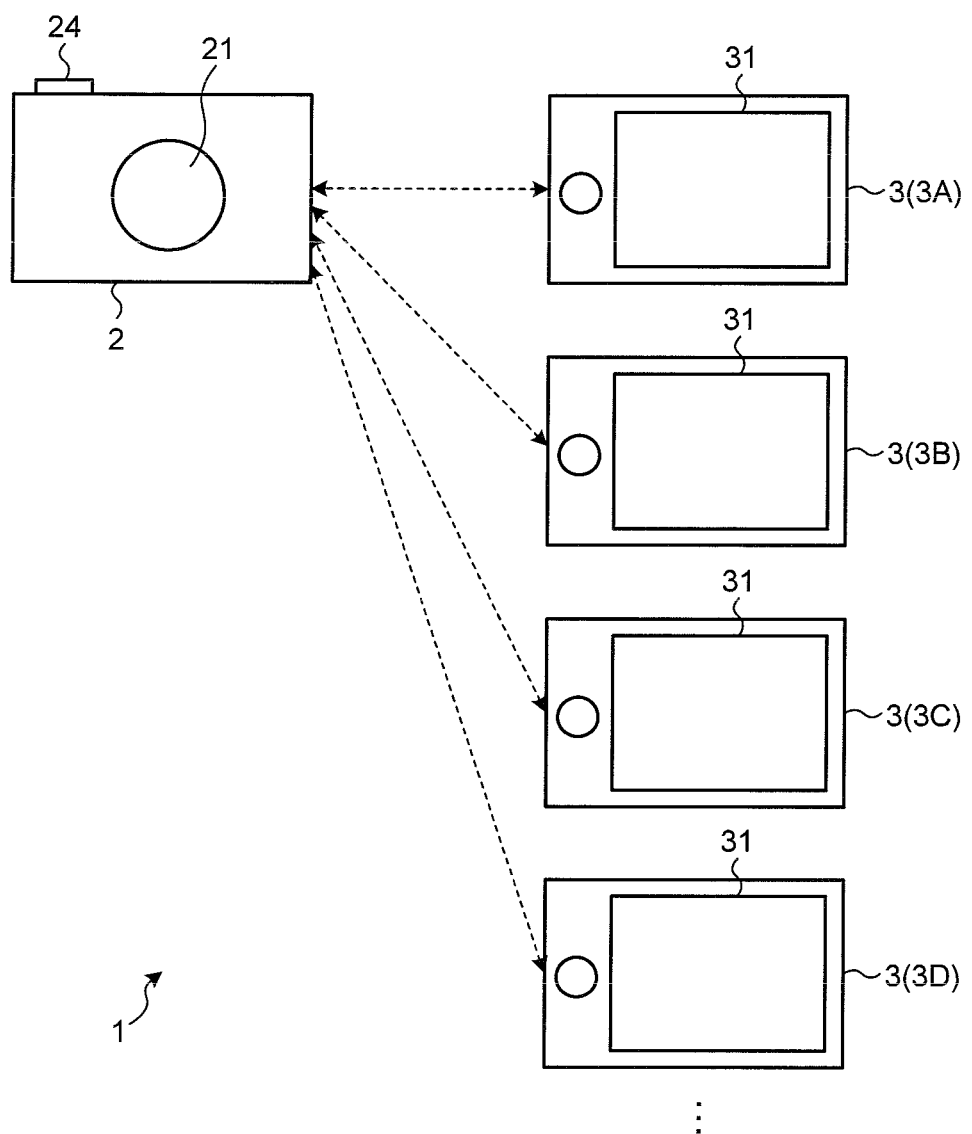
FIG. 1 is a diagram schematically illustrating a structure of an imaging system according to a first embodiment of the present invention.

Embodiments of the present invention will be explained with reference to the drawings. It is noted that the present invention is not limited by the embodiments explained below. Further, in the drawings, same components are represented by same reference numerals.

First Embodiment
Outline Structure of Imaging System

FIG. 1 is a block diagram illustrating a structure of an imaging system 1 according to a first embodiment of the present invention. The imaging system 1 includes an imaging device 2 (FIG. 1) and plural communication devices 3 (FIG. 1) which are operated by different users and connected via radio communication to transmit and receive information to and from one another. In FIG. 1, only four of first to fourth communication devices 3A to 3D are illustrated as the plural communication devices 3; however, the number of the communication devices 3 may be any number if it is two or more.

Here, as substitute for radio communication, the imaging system 1 may have a structure in which the imaging device 2 and the plural communication devices 3 are connected via wired communication to transmit and receive information to and from one another.

The imaging system 1 is a system in which a user of the communication device 3 executes an imaging operation with the communication device 3 and the imaging device 2 which is placed away from the communication device 3 transmits an image, which is captured at almost the same time as the timing of the imaging operation, to the communication device 3.

Structure of Imaging Device

Figure 2:
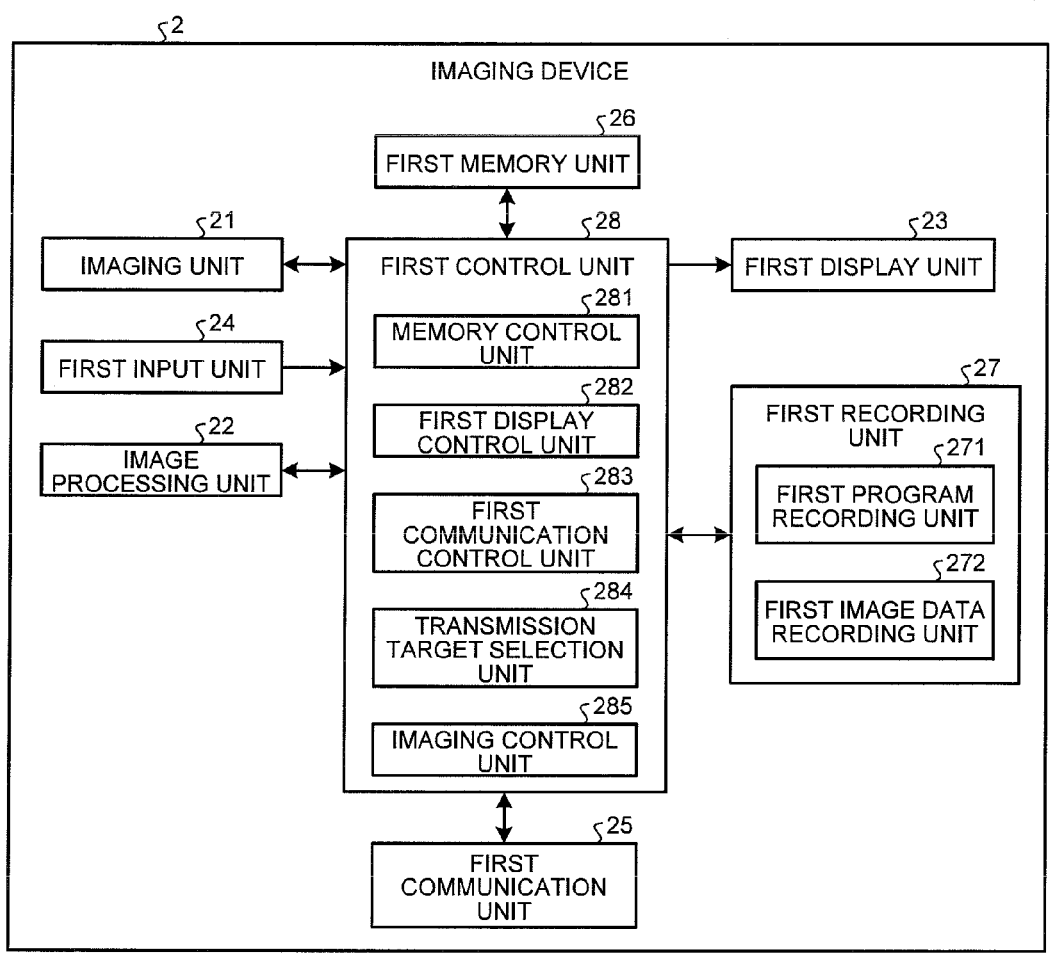
FIG. 2 is a block diagram illustrating a structure of an imaging device illustrated in FIG. 1.

FIG. 2 is a block diagram illustrating a structure of the imaging device 2.

The imaging device 2 is a device for capturing an image of a subject and is composed as a digital camera, a digital camcorder, an electronic device such as a mobile phone and a tablet computer type mobile device, which include an imaging function, an endoscope, or a microscope for example. In FIG. 1, the imaging device 2 is illustrated as a digital camera.

In the following description, as a structure of the imaging device 2, a main part of the present invention will be mainly explained.

As illustrated in FIG. 2, the imaging device 2 includes an imaging unit 21, an image processing unit 22, a first display unit 23, a first input unit 24, a first communication unit 25, a first memory unit 26, a first recording unit 27, and a first control unit 28.

The imaging unit 21 captures an image of a subject and generates an image data under a control of the first control unit 28. The imaging unit 21 is composed of an optical system for forming an image of a subject (see FIG. 1), an imaging element such as a CCD (Charge Coupled Device) for optically receiving the subject image formed by the optical system and converting the image into an electrical signal, a signal processing unit for generating digital image data by executing a signal processing (A/D conversion or the like) on the electrical signal (analog signal) from the imaging element, and the like.

Then, under the control of the first control unit 28, the image data generated by the imaging unit 21 is sequentially stored in the first memory unit 26 after being associated with time information related to the time when the image data is generated (this corresponds to identification information of the present invention; hereinafter it is referred to as a time stamp). Further, under the control of the first control unit 28, the image data generated by the imaging unit 21 is recorded in the first recording unit 27 according to an imaging operation on the first input unit 24 by the user of the imaging device 2.

Under the control of the first control unit 28, the image processing unit 22 performs an image process on image data every time image data is generated by the imaging unit 21 and stored in the first memory unit 26.

According to the first embodiment, the image processing unit 22 executes a resizing process to reduce the image size, as the above image process. In the following description, the image data to which the resizing process is performed by the image processing unit 22 is referred to as resized image data. Further, the image data before the resizing process is processed by the image processing unit 22 is referred to as live view image data.

Then, the resized image data (including a time stamp) generated in the image processing unit 22 is stored in the first memory unit 26.

The first display unit 23 is composed of a display panel made of liquid crystal, organic EL (Electro Luminescence) or the like and displays various images under the control of the first control unit 28. Further, under the control of the first control unit 28, the first display unit 23 displays operation information of the imaging device 2, information related to imaging, and the like according to need.

The first input unit 24 is composed of a button, a switch or the like for accepting user's operation (see FIG. 1) and outputs an instruction signal according to the user's operation to the first control unit 28.

Under the control of the first control unit 28, the first communication unit 25 performs radio communication with the plural communication devices 3 using a predetermined protocol to transmit resized image data (including a time stamp) and various data including a signal required in the communication.

The first memory unit 26 stores live view image data (including a time stamp) generated in the imaging unit 21, resized image data (including a time stamp) to which a resizing process is performed in the image processing unit 22, and the like.

In other words, the first memory unit 26 has a function as a storing unit of the present invention.

The first recording unit 27 includes a first program recording unit 271 and a first image data recording unit 272 as illustrated in FIG. 2.

The first program recording unit 271 records various programs (including an imaging program) which are executed by the first control unit 28, various data used during the execution of the programs, and the like.

Under the control of the first control unit 28, the first image data recording unit 272 records image data generate by the imaging unit 21 in response to an imaging operation on the first input unit 24 by the user of the imaging device 2.

The first control unit 28 is composed of a CPU (Central Processing Unit) or the like and controls operation of the imaging device 2 overall by giving a corresponding instruction or transferring data to each unit constituting the imaging device 2 in response to an instruction signal or the like from the first input unit 24.

As illustrating in FIG. 1, the first control unit 28 includes a memory control unit 281, a first display control unit 282, a first communication control unit 283, a transmission target selection unit 284, and an imaging control unit 285.

Every time live view image data is generated in the imaging unit 21, the memory control unit 281 stores the live view image data in the first memory unit 26 as associating the data with a time stamp related to the time when the live view image data is generated.

The first display control unit 282 controls operation of the first display unit 23 so that the first display unit 23 displays an image.

Concretely, the first display control unit 282 sequentially reads newest live view image data stored in the first memory unit 26 and controls the first display unit 23 to display a live view image (live view display) corresponding to the live view image data. Further, in response to a reproducing operation of "displaying an image corresponding to the recorded image" on the first input unit 24 by the user of the imaging device 2, the first display control unit 282 reads the image data recorded in the first image data recording unit 272 and controls the first display unit 23 to display an image corresponding to the image data. Here, regarding the responsiveness or the like of the system, the "newest" means the latest data as possible and may not actually be the newest data in some designs.

The first communication control unit 283 controls operation of the first communication unit 25 to perform radio communication with the plural communication devices 3.

Concretely, the first communication control unit 283 sequentially transmits the newest image data (resized image data (including a time stamp)) to the plural communication devices 3 by transmitting image data (resized image data (including a time stamp)) generated by the imaging unit 21 to one of the communication devices 3 via the first communication unit 25 and transmitting image data (resized image data (including a time stamp)) generated next by the imaging unit 21 to another of the communication devices 3.

In the first embodiment, the order of transmission of the newest resized image data (including a time stamp) to the plural communication devices 3 is previously set. For example, when communication is executed with the first to fourth communication devices 3A to 3D, the first communication control unit 283 performs an operation for transmitting the newest resized image data (including a time stamp) to the first communication device 3A, the second communication device 3B, the third communication device 3C, and the fourth communication device 3D in order and repeats this operation. In the following description, the above described transmission operation (an operation for repeatedly transmitting the newest resized image data to each communication device 3 in predetermined order) by the first communication control unit 283 is referred to as a sequential transmission operation.

Further, the first communication control unit 283 receives, via the first communication unit 25, a still image transmission request (including elapsed time information and a time stamp) from an operated communication device 3, which is one of the plural communication devices 3 that the user has performed an imaging operation.

Further, when a transmission target image data is selected by the transmission target selection unit 284, the first communication control unit 283 transmits the transmission target image data to the operated communication device 3 via the first communication unit 25.

Based on the still image transmission request (including elapsed time information and a time stamp) received via the first communication unit 25, the transmission target selection unit 284 selects the transmission target image data among the plural pieces of resized image data stored in the first memory unit 26 to be transmitted to the operated communication device 3.

Here, the transmission target image data corresponds to the live view image data (resized image data) generated by the imaging unit 21 at almost the same timing as the user of the operated communication device 3 operates the imaging operation with the operated communication device 3. Then, the transmission target image data corresponds to a reproduction priority candidate image data of the present invention, which is obtainable and reproducible by the operated communication device 3. In other words, the transmission target selection unit 284 has a function as an image selection unit according to the present invention.

In response to the imaging operation on the first input unit 24 by the user of the imaging device 2, the imaging control unit 285 controls the imaging unit 21 to capture an image of a subject and records, to the first image data recording unit 272, the image data generated by imaging by the imaging unit 21.

Structure of Communication Device

Figure 3:
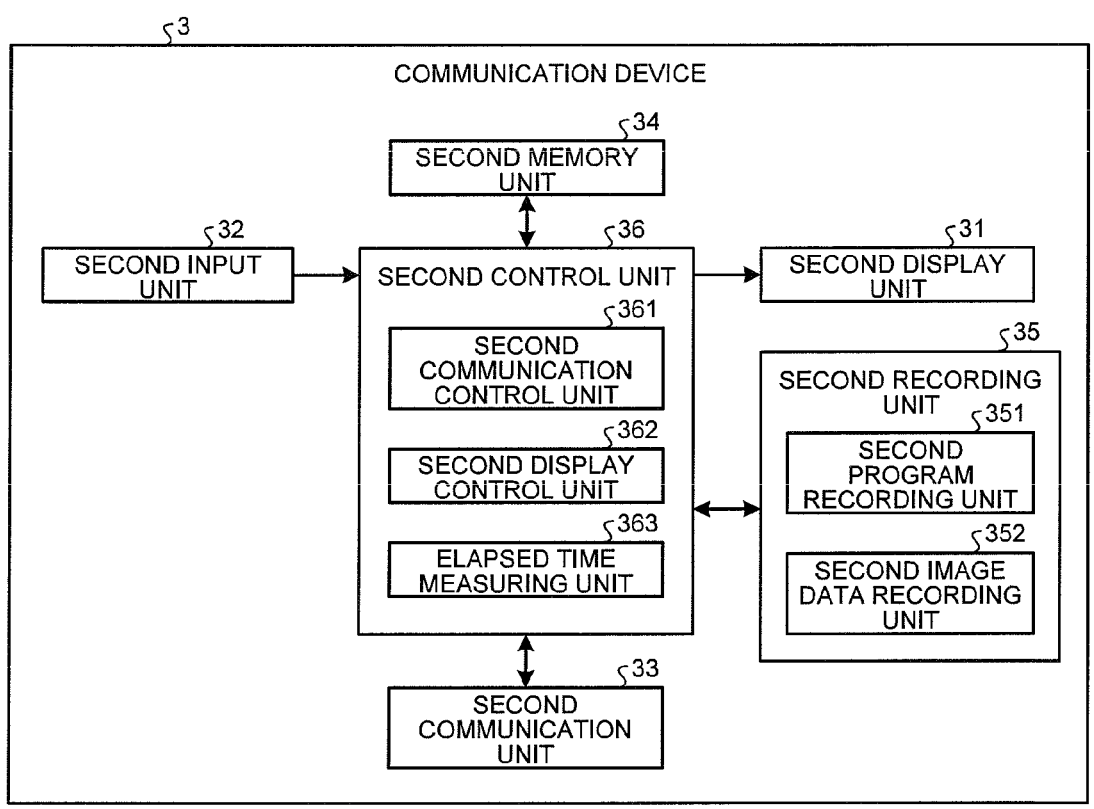
FIG. 3 is a block diagram illustrating a structure of a communication device illustrated in FIG. 1.

FIG. 3 is a block diagram illustrating a structure of the communication device 3.

The plural communication devices 3 are devices for performing radio communication with the imaging device 2 and are composed as digital cameras, digital camcorders, mobile phones, tablet computer type mobile devices, personal computers, head mount displays or the like, for example. FIG. 1 illustrates the plural communication devices 3 as mobile phones.

Here, in the following, a main part of the present invention will be mainly explained as the structure of the plural communication devices 3. Further, since the structures of the plural communication devices 3 have the same main part of the present invention, the structure of one communication device 3 (the main part of the present invention) will be explained.

As illustrated in FIG. 3, the communication device 3 includes a second display unit 31, a second input unit 32, a second communication unit 33, a second memory unit 34, a second recording unit 35, and a second control unit 36.

The second display unit 31 is composed of a display panel made of liquid crystal, organic EL or the like (see FIG. 1) and displays various images under the control of the second control unit 36.

Then, the second display unit 31 has a function as a display unit according to the present invention.

The second input unit 32 is composed of a button, a switch, a touch panel, a microphone and the like.

In other words, the second input unit (button, switch) 32 receives user's operation by the user of the communication device 3 and outputs an instruction signal corresponding to the user's operation to the second control unit 36. Further, the second input unit (touch panel) 32 detects a touch of an external object and outputs a location signal corresponding to the location of the detected touch to the second control unit 36. Further, the second input unit (microphone or the like) 32 inputs a word (voice) brought out by the user of the communication device 3 to convert into an electrical signal, executes an analog-digital conversion by performing sampling and quantizing of the converted electrical signal to generate voice data, and outputs the voice data to the second control unit 36.

Then, the second input unit 32 has a function as an operation accepting unit according to the present invention.

Under the control of the second control unit 36, the second communication unit 33 executes radio communication with the imaging device 2 for various data including resized image data (including a time stamp) and a signal required in the communication according to a predetermined protocol.

The second memory unit 34 stores resized image data (including a time stamp) and the like which are transmitted from the imaging device 2 and received via the second communication unit 33.

As illustrated in FIG. 3, the second recording unit 35 includes a second program recording unit 351 and a second image data recording unit 352.

The second program recording unit 351 stores various programs executed by the second control unit 36 and various data and the like used during the execution of the programs.

Under the control of the second control unit 36, the second image data recording unit 352 records transmission target image data which is transmitted by the imaging device 2 in response to the still image transmission request and is received via the second communication unit 33.

The second control unit 36 is composed of a CPU or the like and controls operation of the communication device 3 overall by executing an instruction, data transfer, and the like to each part constituting the communication device 3 in response to an instruction signal, a location signal, voice data and the like from the second input unit 32.

As illustrated in FIG. 3, the second control unit 36 includes a second communication control unit 361, a second display control unit 362, and an elapsed time measuring unit 363.

The second communication control unit 361 controls operation of the second communication unit 33 to execute radio communication with the imaging devices 2.

Concretely, the second communication control unit 361 sequentially receives resized image data (including a time stamp) from the imaging device 2 via the second communication unit 33. Further, in response to an imaging operation on the second input unit 32 by the user of the communication device 3 (an operation on the button or switch, an operation on the touch panel, an input of a word brought out by the user, or the like), the second communication control unit 361 transmits, to the imaging device 2, a still image transmission request (including elapsed time information related to the elapsed time measured by the elapsed time measuring unit 363 and a time stamp associated with the newest resized image data) for requesting a transmission of an image captured at almost the same timing as the imaging operation.

In other words, the second communication control unit 361 has a function as a communication control unit according to the present invention.

The second display control unit 362 controls the operation of the second display unit 31 so that the second display unit 31 displays an image thereon.

Concretely, the second display control unit 362 sequentially reads newest resized image data stored in the second memory unit 34 and displays images corresponding to the resized image data (live view image) on the second display unit 31 (live view display). Further, the second display control unit 362 reads transmission target image data recoded in the second image data recording unit 352 and displays the image corresponding to the transmission target image data on the second display unit 31.

In other words, the second display control unit 362 has a function as a display control unit according to the present invention.

The elapsed time measuring unit 363 measures elapsed time from a reception of the newest resized image data from the imaging device 2 via the second communication unit 33 until an execution of an imaging operation on the second input unit 32 by the user of the communication device 3.

Operation of Imaging System

Next, the above described operation of the imaging system 1 will be explained.

Hereinafter, as operation of the imaging system 1, an operation of the imaging device 2 (an imaging method according to the present invention) and operations of the plural communication devices 3 will be explained.

Here, since the operations of the plural communication devices 3 are substantially the same, an operation of one communication device 3 will be explained.

Operation of Imaging Device

Figure 4:
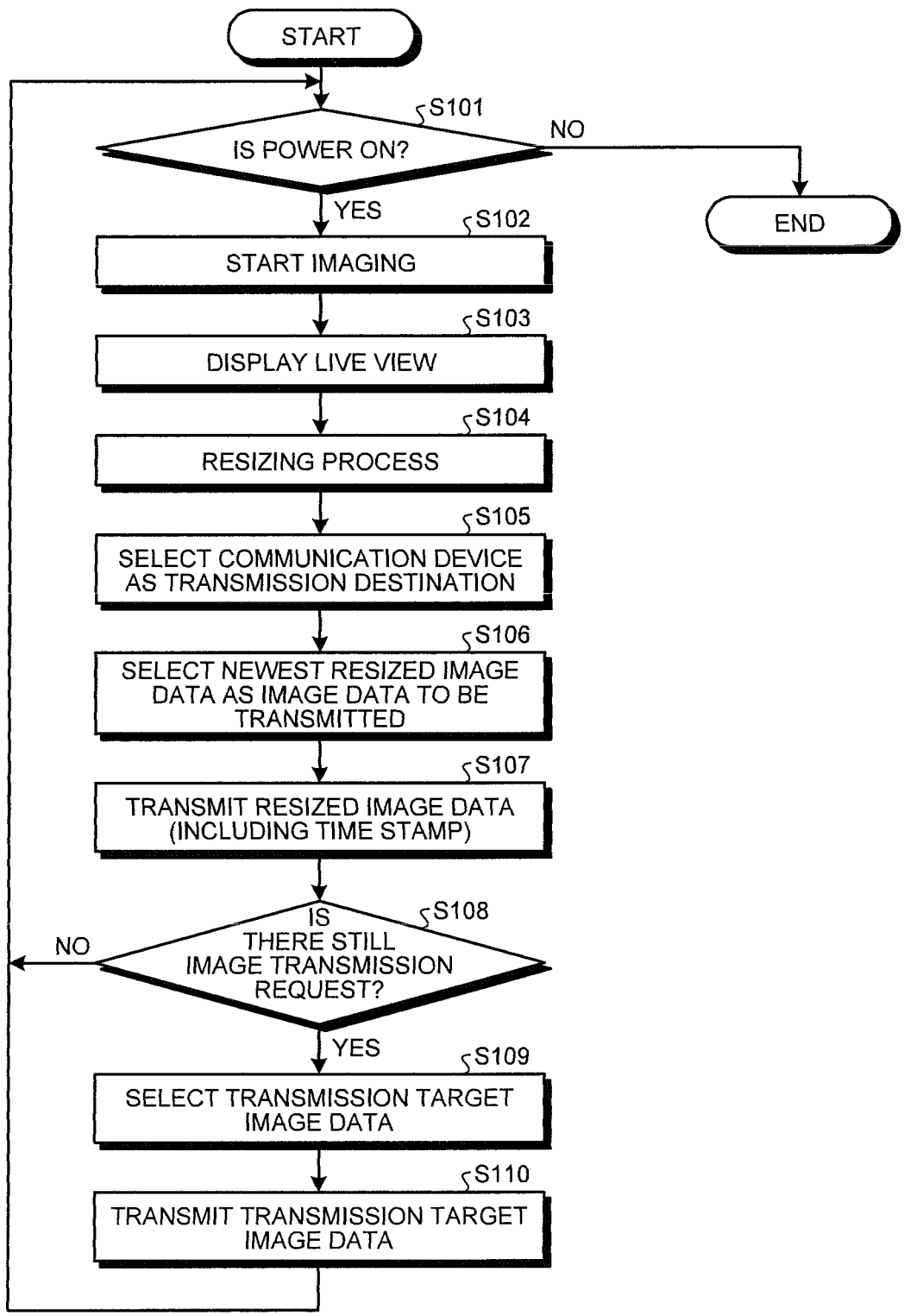
FIG. 4 is a flowchart illustrating an operation of the imaging device illustrated in FIG. 2.

FIG. 4 is a flowchart illustrating an operation of the imaging device 2.

When the power of the imaging device 2 is turned on by an operation on the first input unit 24 by the user of the imaging device 2 (step S101: Yes), the first control unit 28 controls the imaging unit 21 to start imaging (step S102: imaging step). Then, the memory control unit 281 sequentially stores, in the first memory unit 26, live view images generated by the imaging unit 21 as associating with a time stamp related to the time when the live view image data is generated.

Next, the first display control unit 282 reads the newest live view image data stored in the first memory unit 26 and controls the first display unit 23 to start a live view display (step S103).

Next, the image processing unit 22 reads the newest live view image data stored in the first memory unit 26 and performs a resizing process on the newest live view image data (step S104). Then, the resized image data (including a time stamp) generated in the image processing unit 22 is stored in the first memory unit 26.

Next, according to the previously set transmission order, the first communication control unit 283 selects one communication device 3, among the plural communication devices 3 communicatably connected to the imaging device 2, as a transmission destination of the image data to be transmitted (step S105).

Next, the first communication control unit 283 selects the newest resized image data as image data to be transmitted to the communication device 3 selected in step S105 (step S106).

Next, the first communication control unit 283 transmits the newest resized image data (including a time stamp) selected in S106 to the communication device 3 selected in step S105 via the first communication unit 25 (step S107: transmission step).

Next, for the sake of convenience in description, FIG. 4 illustrates that steps S104 to S107 are executed after step S103; however, in actual, step S103 and steps S104 to S107 are executed at substantially the same time.

Next, the first communication control unit 283 determines whether or not a still image transmission request (including elapsed time information and a time stamp) has been received, via the first communication unit 25, from the operated communication device 3 among the plural communication devices 3, on which the imaging operation is performed by the user (step S108).

When it is determined that a still image transmission request has not been received (step S108: No), the imaging device 2 returns to step S101.

On the other hand, when it is determined that a still image transmission request has been received (step S108: Yes (reception step)), the transmission target selection unit 284 selects transmission target image data to be transmitted to the operated communication device 3 among plural pieces of resized image data stored in the first memory unit 26 based on the still image transmission request (including elapsed time information and a time stamp) received via the first communication unit 25 (step S109: image selection step).

Concretely, in step S109, the transmission target selection unit 284 selects transmission target image data as described below.

Here, the respective time stamps associated, by the memory control unit 281, with respective pieces of live view image data which are sequentially generated by the imaging unit 21 are referred to as $T_1, T_2, T_3, \ldots, T_m$ according to the temporal sequence. Further, it is assumed that the time stamp included in the still image transmission request received from the operated communication device 3 via the first communication unit 25 is $T_{base}$ and the elapsed time based on the elapsed time information is $T_s$.

Firstly, the transmission target selection unit 284 adds elapsed time $T_s$ based on elapsed time information included in the still image transmission request, which is received from the operated communication device 3 via the first communication unit 25, to a time stamp $T_{base}$ included in the still image transmission request, and calculates the time $T_{target}$ ($T_{target}=T_{base}+T_s$) which is used as a target to select transmission target image data. Then, the transmission target selection unit 284 selects transmission target image data to which a time stamp $T_n$ that satisfies following Equation (1) from the plural pieces of resized image data based on respective time stamps associated with the plural pieces of resized image data stored in the first memory unit 26.

$$T_n < T_{target} \leq T_{n+1} \tag{1}$$

Subsequently, the first communication control unit 283 transmits the transmission target image data selected in step S109 to the operated communication device 3 via the first communication unit 25 (step S110). Then, the imaging device 2 returns to step S101.

Here, in order to simplify the explanation, step S109 is followed by step S110; however, a next imaging timing may occur during the transmission and the images can be transmitted later collectively. It is obvious that the method is not limited to the method for transmitting directly to the operated communication device 3 and a record card, a network, or the like may be used for the transmission. As it will be clear soon, it is important that a preferable image which can be referred to as reproduction priority candidate image data (corresponding to the above described transmission target image data to be transmitted to the operated communication device 3) that is obtainable and reproducible by an obtaining and reproducing device (operated communication device 3) is selected in step S109.

Operation of Communication Device

Figure 5:
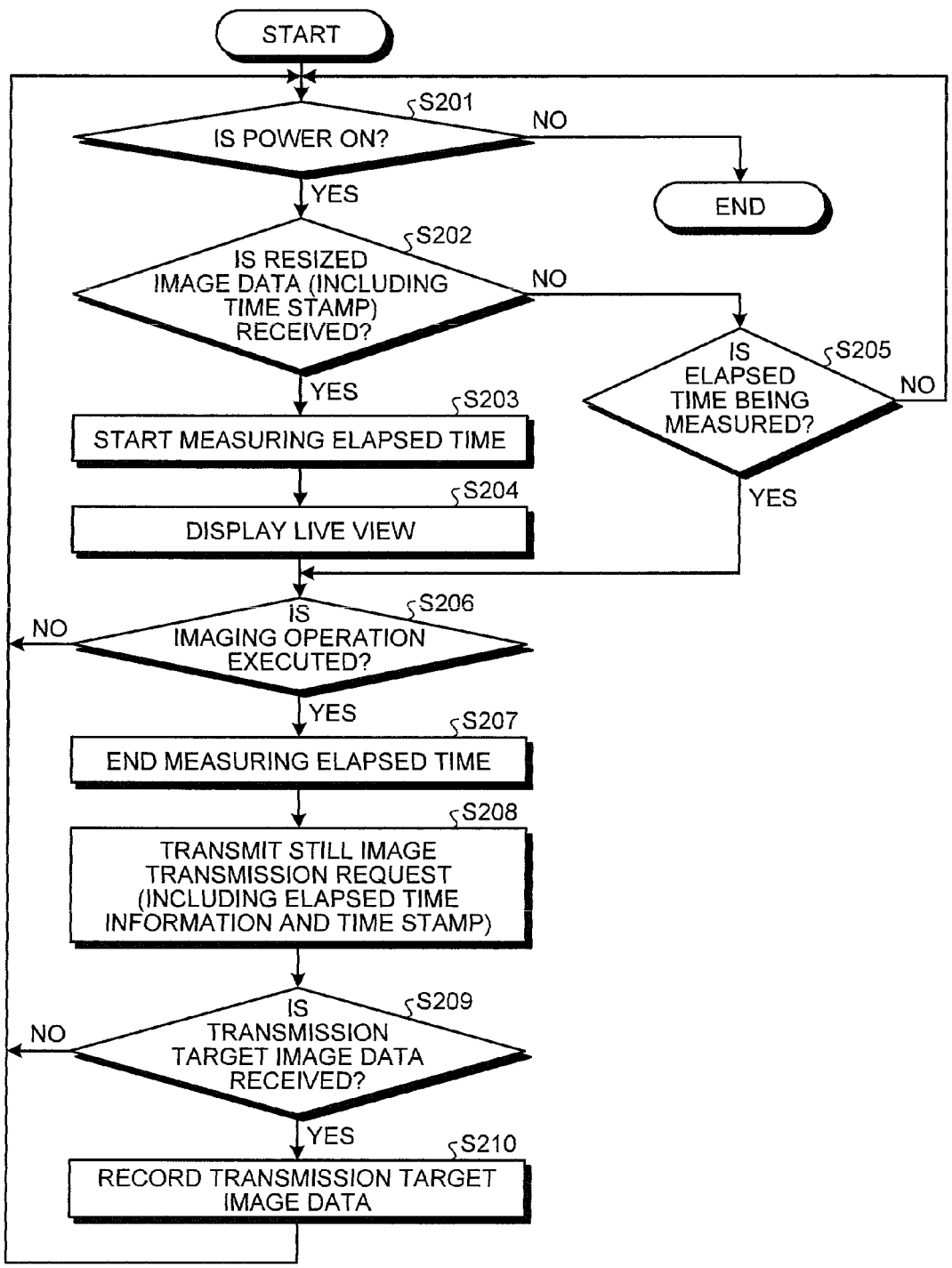
FIG. 5 is a flowchart illustrating an operation of the communication device illustrated in FIG. 3.
Figure 6A:
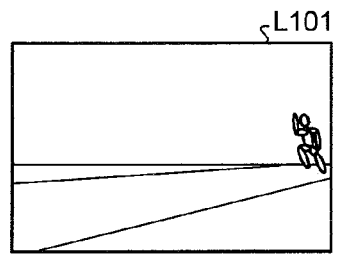
FIGS. 6A to 6F are diagrams illustrating an example of an imaging situation.
Figure 6B:
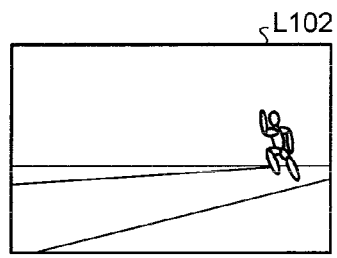
Figure 6C:
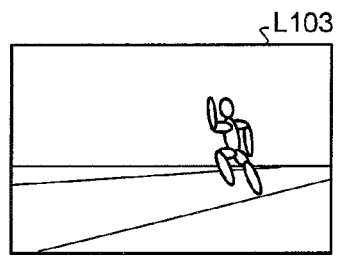
Figure 6D:
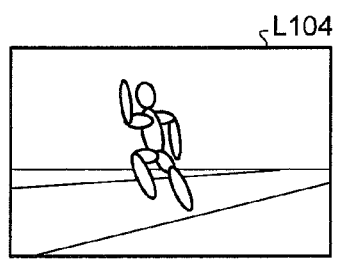
Figure 6E:
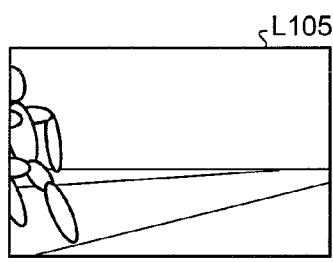
Figure 6F:
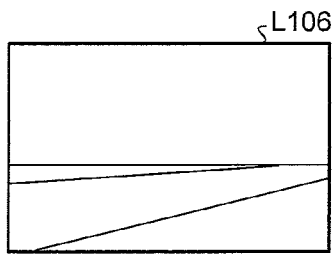

FIG. 5 is a flowchart illustrating an operation of the communication device 3.

When the power of the communication device 3 is turned on by an operation on the second input unit 32 by the user of the communication device 3 (step S201), the second communication control unit 361 determines whether or not resized image data (including a time stamp) has been received from the imaging device 2 via the second communication unit 33 (step S202).

When it is determined that resized image data (including a time stamp) has been received (step S202: Yes), the second control unit 36 sequentially stores the received resized image data (including a time stamp) in the second memory unit 34. Further, the elapsed time measuring unit 363 starts to measure elapsed time since the reception of the resized image data (including a time stamp) (step S203).

Subsequently, the second display control unit 362 reads newest resized image data stored in the second memory unit 34 and controls the second display unit 31 to start a live view display (step S204). Then, the communication device 3 proceeds to step S206.

Here, for the sake of convenience in description, FIG. 5 illustrates that step S203 is followed by step S204; however, in actual, step S203 and step S204 are executed at substantially the same time.

On the other hand, when it is determined that resized image data (including a time stamp) has not been received (step S202: No), the second control unit 36 determines whether or not the measurement of the elapsed time has started in step S203 and the elapsed time is still being measured (step S205).

When it is determined that the elapsed time is not being measured (step S205: No), the communication device 3 returns to step S201.

On the other hand, when it is determined that the elapsed time is being measured (step S205: Yes), the communication device 3 proceeds to step S206.

After step S204 or when it is determined that the elapsed time is being measured (step S205: Yes), the second control unit 36 determines whether or not an imaging operation has been executed on the second input unit 32 by the user of the communication device 3 (step S206).

When it is determined that there is no imaging operation (step S206: No), the communication device 3 returns to step S201.

On the other hand, it is determined that there has been an imaging operation (step S206: Yes), the elapsed time measuring unit 363 ends the elapsed time measurement which started in step S203 (step S207).

Next, the second communication control unit 361 transmits a still image transmission request (including elapsed time information related to the elapsed time measured in steps S203 to S207 and a time stamp associated with the newest resized image data stored in the second memory unit 34) to the imaging device 2 via the second communication unit 33 (step S208).

Next, the second communication control unit 361 determines whether or not transmission target image data has been received from the imaging device 2 via the second communication unit 33 (step S209).

When it is determined that transmission target image data has not been received (step S209: No), the communication device 3 returns to step S201.

On the other hand, when it is determined that transmission target image data has been received (step S209: Yes), the second control unit 36 records the transmission target image data to the second image data recording unit 352 (step S210).

Here, to simplify the description, step S208 is followed by step S209; however, a next imaging timing may occur during the reception or recording, and transmission target image data (obtainable and reproducible reproduction priority candidate image data) may be collectively obtained later. It is obvious that in this method, it is not required to receive data directly from the imaging device and may be received via a record card, a network or the like.

Illustrative Example of an Imaging Situation and Communication

In order to describe the above described operation of the imaging system 1 in further detail, an illustrative example of an imaging situation of the imaging device 2 and communication executed by the imaging system 1 in the imaging situation will be explained.

Figure 7:
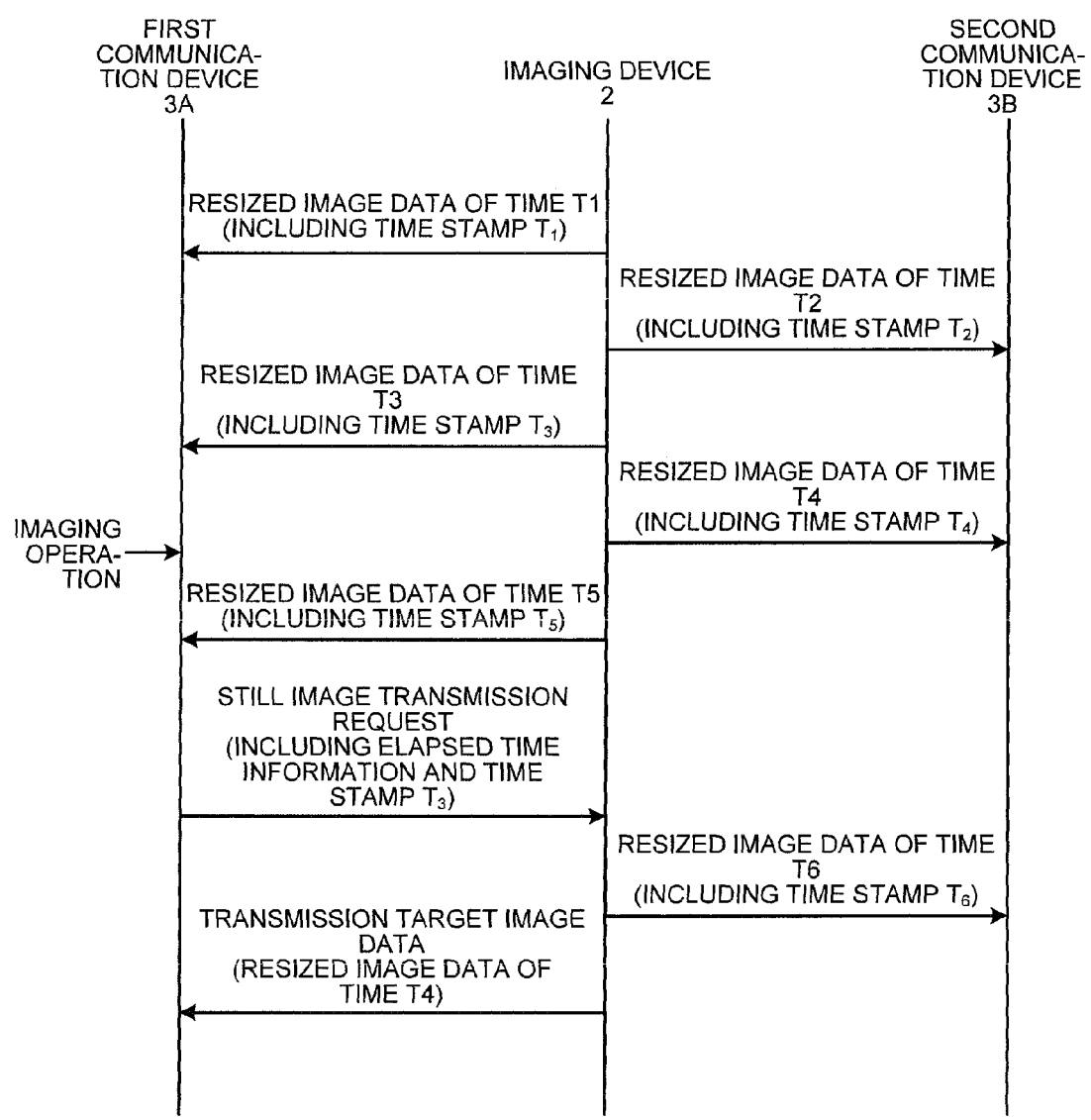
FIG. 7 is a sequence diagram illustrating an example of communication between the imaging device and first and second communication devices in the imaging situation illustrated in FIGS. 6A to 6F.
Figure 8:
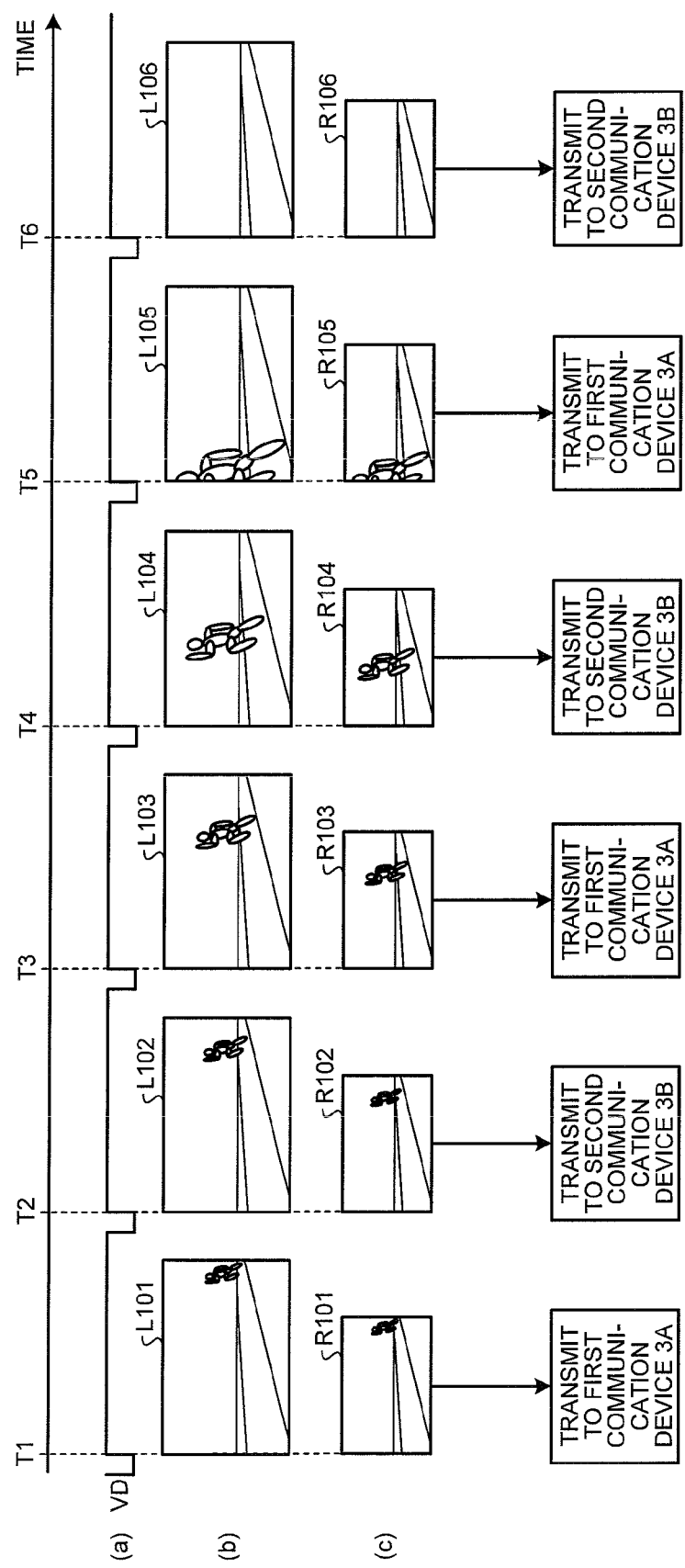
FIG. 8 is a diagram illustrating an example of timings of transmitting image data to be transmitted from the imaging device to the first and second communication devices in the imaging situation illustrated in FIGS. 6A to 6F.

FIGS. 6A to 6F are diagrams illustrating an example of an imaging situation. FIG. 7 is a sequence diagram illustrating an example of communication executed between the imaging device 2 and the first and second communication devices 3A and 3B in the imaging situation illustrated in FIGS. 6A to 6F. FIG. 8 is a diagram illustrating an example of transmission timings of the image data transmitted from the imaging device 2 to the first and second communication devices 3A and 3B in the imaging situation illustrated in FIGS. 6A to 6F.

Concretely, FIGS. 6A to 6F illustrate live view images L101 to L106 sequentially displayed on the imaging device 2. In FIG. 8, (a) illustrates a vertical synchronizing signal VD. In FIG. 8, (b) illustrates the live view images L101 to L106 illustrated in FIGS. 6A to 6F. In FIG. 8, (c) illustrates resized images R101 to R106 corresponding to resized image data transmitted from the imaging device 2 to the first and second communication devices 3A and 3B.

Here, the resized images R101 to R106 are made by performing a resizing process on the live view images L101 to L106.

As the imaging situation, for example, as illustrated in FIGS. 6A to 6F, an imaging situation for capturing an image of a subject which is a child running in a school athletic meeting will be considered. In this case, the angle of view is fixed and the imaging device 2 sequentially displays the live view images L101 to L106 in which the subject image of the running child shifts from the right side to the left side as illustrated in FIGS. 6A to 6F.

Here, as illustrated in FIG. 8, the live view images L101 to L106 are images sequentially captured by the imaging unit 21 in synchronization with the vertical synchronizing signal VD. In more detail, the live view image L101 is an image captured at time T1 and time stamp $T_1$ is associated therewith. Similarly, the live view images L102 to L106 are images respectively captured at times T2 to T6 and time stamps $T_2$ to $T_6$ are respectively associated therewith.

A case will be considered that the imaging device 2 and two communication devices 3, the first and second communication devices 3A and 3B execute communication in the above described imaging situation.

The imaging device 2 repeatedly transmits the newest resized image data to the first and second communication devices 3A and 3B alternately by executing the sequential transmission operation (repeating steps S102 to S107).

As a result, as illustrated in FIGS. 7 and 8, the imaging device 2 transmits resized image data (including time stamp $T_1$) corresponding to resized image R101, resized image data (including time stamp $T_3$) corresponding to resized image R103, and resized image data (including time stamp $T_5$) corresponding to resized image R105 to the first communication device 3A.

In other words, the first communication device 3A sequentially displays resized images R101, R103, R105 by repeatedly executing step S204.

Further, the imaging device 2 transmits resized image data (including time stamp $T_2$) corresponding to sized image R102, resized image data (including time stamp $T_4$) corresponding to resized image R104, and resized image data (including time stamp $T_6$) corresponding to resized image R106 to the second communication device 3B.

In other words, the second communication device 3B sequentially displays resized images R102, R104, R106 by repeatedly executing step S204.

Here, as illustrated in FIG. 7, regarding the first communication device 3A, a case that the user of the first communication device 3A performs an imaging operation after the reception of the resized image data (including time stamp $T_3$) at time T3 and before the reception of the resized image data (including time stamp $T_5$) at time T5 will be considered.

In this case, the first communication device 3A as an operated communication device transmits elapsed time information related to the elapsed time $T_s$ measured during steps S203 to S207 and a still image transmission request including time stamp $T_3$ associated with the newest resized image data (time stamp $T_3$) to the imaging device 2 (step S208).

On the other hand, in step S109, the imaging device 2 which has received a still image transmission request from the first communication device 3A calculates time $T_{target}$, based on the received still image transmission request, as a target by adding elapsed time $T_s$ based on the elapsed time information to time stamp $T_3$ and selects transmission target image data to which time stamp $T_n$ satisfying Equation (1) is associated. Then, in step S110, the imaging device 2 transmits the transmission target image data to the first communication device 3A serving as an operated communication device.

For example, when the calculated time $T_{target}$ is the time after time stamp $T_4$ and before time stamp $T_5$, as illustrated in FIG. 7, the imaging device 2 selects, as transmission target image data, resized image data to which time stamp $T_4$ is associated and transmits the transmission target image data to the first communication device 3A.

The above described imaging device 2 according to the first embodiment sequentially transmits the newest resized image data and a time stamp for identifying the resized image data to the plural communication devices 3 by executing the sequential transmission operation (repeatedly executing steps S102 to S107). Further, the imaging device 2 receives elapsed time information and a time stamp from the operated communication device 3 on which the imaging operation is executed.

Thus, based on the elapsed time information and the time stamp, the imaging device 2 can recognize that which image is the image displayed on the operated communication device 3 and how long is the elapsed time between the time when the image is displayed until the time when the imaging operation is performed on the operated communication device 3. Then, the imaging device 2 can specify recognized images among plural pieces of resized image data captured and stored in the first memory unit 26, specify the recognized image (transmission target image data) generated after the elapsed time from the images, and transmit the transmission target image data to the operated communication device 3 (steps S109 and S110).

Thus, the imaging device 2 according to the first embodiment can transmit, to the operated communication device 3, image data (transmission target image data) which is captured at almost the same time as an imaging operation executed by the user of the operated communication device 3 with precise timing. In other words, the imaging device 2 according to the first embodiment can transmit image data desired by the user of the operated communication device 3 to the operated communication device 3, and is effective to improve its convenience.

Further, as the identification information according to the present invention, a time stamp related to the time when image data is generated is employed in the imaging device 2 according to the first embodiment.

Thus, since a general function for associating a time stamp to image data can be used as the function for generating identification information and associating the information with image data, it is not required to provide the first control unit 28 with a particular function for generating identification information and associating the information with image data.

Second Embodiment

Next, a second embodiment of the present invention will be explained.

In the following explanation, the same numeral numbers are applied to the same components and steps which are the same as those in the above first embodiment and detailed explanations will be omitted or simplified.

In the above described first embodiment, when a still image transmission request is received from the operated communication device 3, the imaging device 2 selects one piece of resized image data (transmission target image data) and transmits the transmission target image data to the operated communication device 3 in steps S109 and S110.

On the other hand, the imaging device according to the second embodiment compares transmission target image data with resized image data immediately before or immediately after the transmission target image data in temporal sequence, and when the change in the subject images of the respective pieces of image data is large, another piece of resized image data is also transmitted to the operated communication device 3 in addition to the transmission target image data.

Hereinafter, a structure of an imaging device 2A which constitutes an imaging system 1A according to the second embodiment will be explained. Here, since the plural communication devices 3 constituting the imaging system 1A have the same structure as the communication device 3 described in the first embodiment, those explanations will be omitted.

Structure of Imaging Device

Figure 9:
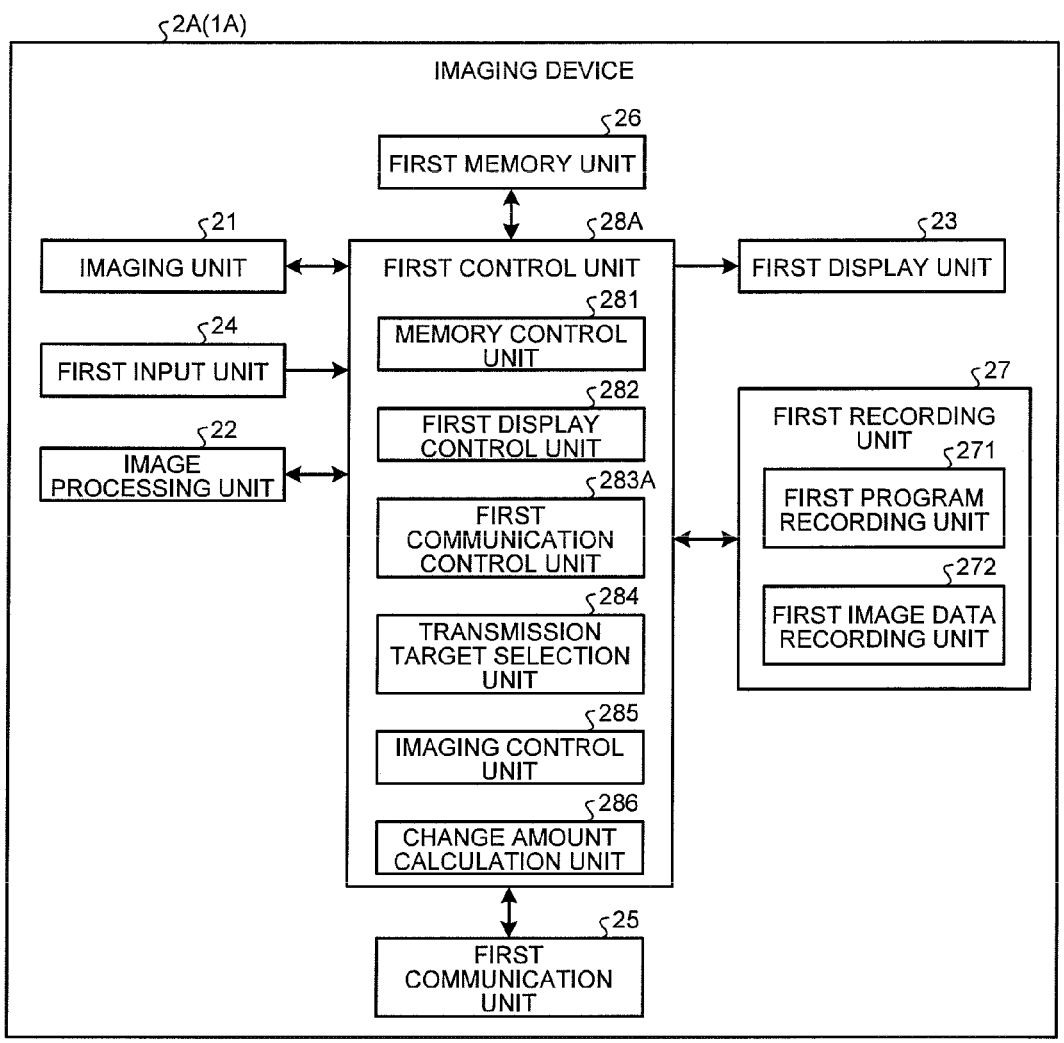
FIG. 9 is a block diagram illustrating a structure of an imaging device according to a second embodiment of the present invention.

FIG. 9 is a block diagram illustrating a structure of the imaging device 2A according to the second embodiment of the present invention.

As illustrated in FIG. 9, in first control unit 28A constituting the imaging device 2A according to the second embodiment, a change amount calculation unit 286 is added, compared with the imaging device 2 (FIG. 2) of the above explained first embodiment.

The change amount calculation unit 286 reads, based on the time stamps, transmission target image data and resized image data generated immediately before or immediately after the transmission target image data in time series among the plural pieces of resized image data stored in the first memory unit 26. Then, the change amount calculation unit 286 calculates a change amount of the subject image included in the respective pieces of read image data.

Then, a first communication control unit 283A according to the second embodiment has a function which is partially changed corresponding to the addition of the change amount calculation unit 286, compared to the first communication control unit 283 explained in the above first embodiment.

Operation of Imaging System

Next, an operation of the imaging system 1A according to the second embodiment will be explained.

In the following description, as an operation of the imaging system 1A, an operation of the imaging device 2A (the imaging method according to the present invention) and an operation of the plural communication devices 3 will be explained in order, similarly to the above first embodiment.

Operation of Imaging Device

Figure 10:
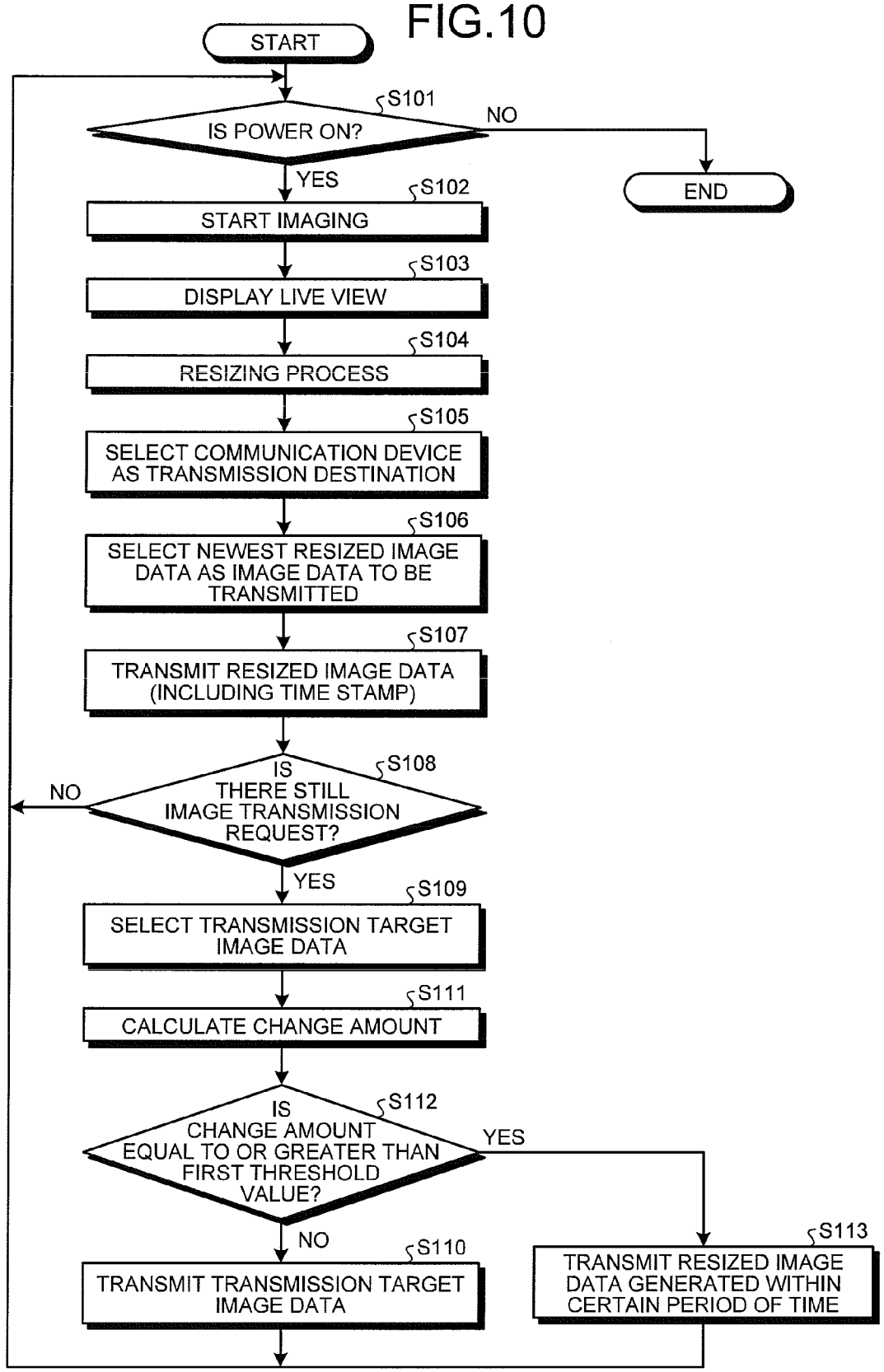
FIG. 10 is a flowchart illustrating an operation of the imaging device illustrated in FIG. 9.

FIG. 10 is a flowchart illustrating an operation of the imaging device 2A.

As illustrated in FIG. 10, the operation of the imaging device 2A according to the second embodiment has only difference from the operation of the above described imaging device 2 in the first embodiment (FIG. 4) that steps S111 to S113 are added.

Thus, only steps S111 to S113 will be explained.

Step S111 is executed after step S109.

Concretely, in step S111, the change amount calculation unit 286 reads, based on the time stamps, transmission target image data selected in step S109 and resized image data generated at an adjoining timing immediately before or immediately after the transmission target image data in time series, from plural pieces of resized image data stored in the first memory unit 26. Then, the change amount calculation unit 286 calculates a change amount (displacement amount) of the subject image included in respective pieces of read image data (the subject image of a running child in the example of FIGS. 6A to 6F or FIG. 8).

Next, the first communication control unit 283A determines whether or not the change amount calculated in step S111 is equal to or greater than a first threshold value (whether or not the change in the subject images is large) (step S112).

When it is determined that the change amount is smaller than the first threshold value (the change in the subject images is small) (step S112: No), the imaging device 2A proceeds to step S110.

On the other hand, when it is determined that the change amount is equal to or greater than the first threshold value (the change in the subject images is large) (step S112: Yes), the imaging device 2A proceeds to step S113.

Concretely, in step S113, the first communication control unit 283A reads, from the first memory unit 26, all pieces of the resized image data associated with time stamps from the time of time stamp $T_{base}$ included in the still image transmission request received from the operated communication device 3 via the first communication unit 25 until the time of the time stamp associated with the transmission target image data selected in step S109. Then, the first communication control unit 283A transmits the all pieces of read resized image data to the operated communication device 3 via the first communication unit 25.

For example, in the example of FIGS. 6A to 6F or FIG. 8, time stamp $T_{base}$ included in the still image transmission request transmitted from the first communication device 3A as the operated communication device 3 is time stamp $T_3$. Further, the time stamp associated with the transmission target image data is time stamp $T_4$. Thus, in step S113, the imaging device 2A transmits two pieces of resized image data which are associated with time stamps $T_3$ and $T_4$ to the first communication device 3A.

After that, the imaging device 2A returns to step S101.

Operation of Communication Device

Figure 11:
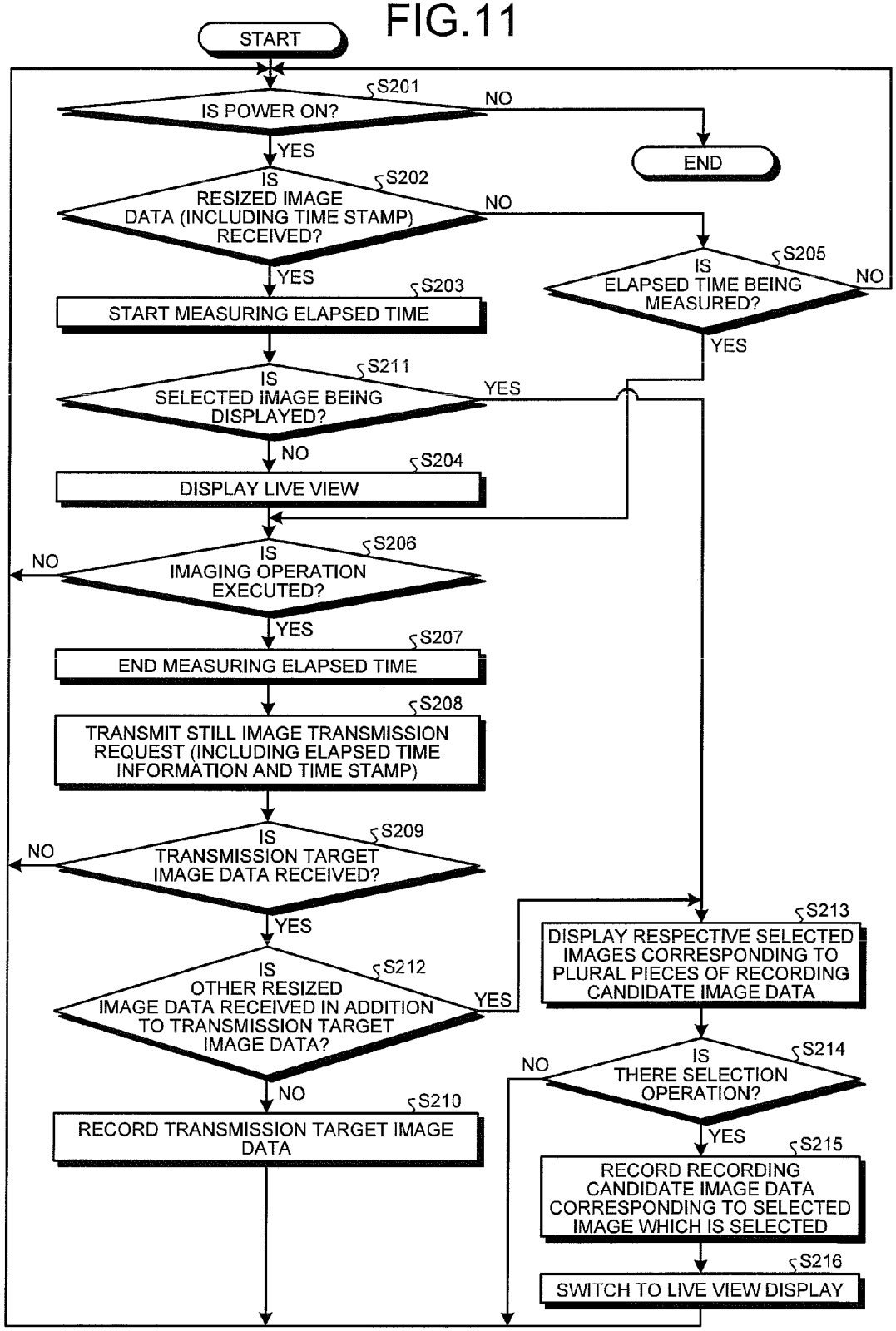
FIG. 11 is a flowchart illustrating an operation of an communication device according to the second embodiment of the present invention.

FIG. 11 is a flowchart illustrating an operation of the communication device 3 according to the second embodiment.

As illustrated in FIG. 11, the operation of the communication device 3 according to the second embodiment has only difference which is an addition of steps S211 to S216, compared to the operation of the communication device 3 in the above described first embodiment (FIG. 5).

Thus, only steps S211 to S216 will be explained.

Step S211 is executed after step S203.

Concretely, the second control unit 36 starts displaying a selected image in later described step S213 and determines whether or not the selected image is being displayed (step S211).

When it is determined that the selected image is not being displayed (step S211: No), the communication device 3 proceeds to step S204.

On the other hand, when it is determined that the selected image is being displayed (step S211: Yes), the communication device 3 proceeds to step S213.

Step S212 is executed when it is determined that transmission target image data is received (step S209: Yes).

Concretely, the second control unit 36 determines whether or not another piece of resized image data is also received from the imaging device 2A via the second communication unit 33 in addition to the transmission target image data (step S212).

When it is determined only a piece of transmission target image data is received (only a piece of resized image data is received) from the imaging device 2A (step S212: No), the communication device 3 proceeds to step S210.

On the other hand, when it is determined that another piece of resized image data in addition to the transmission target image data (plural pieces of resized image data (hereinafter, referred to as plural pieces of recording candidate image data) is also received from the imaging device 2A (step S212: Yes), the communication device 3 proceeds to step S213.

In step S213, the second display control unit 362 displays, on the second display unit 31, each image (selected image) corresponding to the plural recording candidate image data received from the imaging device 2A, and prompts the user of the communication device 3 to select a selected image to be recorded.

Here, regarding the selection of the selected image, only one selected image may be selected, or two or more selected images may be selected.

Next, the second control unit 36 determines whether or not there has been a selection operation (operation on a button or a switch, operation on a touch panel, etc.) on the second input unit 32 by the user of the communication device 3 (step S214).

When it is determined that no selection operation has occurred (step S214: No), the communication device 3 returns to step S201.

On the other hand, when it is determined that there has been a selection operation (step S214: Yes), the second control unit 36 records recording candidate image data (resized image data) corresponding to the selected image which has been selected to the second image data recording unit 352 (step S215).

Next, the second display control unit 362 switches a display state of the second display unit 31 from the selected image display to the live view display same as step S204 (step S216). After that, the communication device 3 returns to step S201.

According to the above described second embodiment, in addition to effects same as those of the above described first embodiment, the following effects can be achieved.

When the change amount in the subject images is large (step S112: Yes), the imaging device 2A according to the second embodiment transmits, to the operated communication device 3, respective image data generated within a predetermined period including the time when the transmission target image data is generated (step S113).

In a case such that the subject is moving, even when the user of the operated communication device 3 performs an imaging operation with the operated communication device 3 with precise timing, the image (transmission target image data) captured by the imaging device 2A at substantially the same time as the imaging operation may not always be in a composition desired by the user of the operated communication device 3.

In such a case, by transmitting, to the operated communication device 3, respective image data generated within a predetermined period including the time when the transmission target image data is generated (step S113), image data desired by the user of the operated communication device 3 can be included in the transmitted image data.

Then, the communication device 3 (operated communication device 3) according to the second embodiment is composed so as to prompt the user of the operated communication device 3 to select each piece of image data (recording candidate image data) (steps S213 to S215). Thus, image data which is unnecessary to the user of the operated communication device 3 is not recorded in the communication device 3.

Further, in the imaging device 2A according to the second embodiment, the predetermined period is specified as a period from the time of the time stamp received from the operated communication device 3 until the time when the transmission target image data is generated.

Thus, when an imaging operation is performed on the operated communication device 3, respective image data arranged in time series from the image being displayed on the operated communication device 3 to the image captured by the imaging device 2A at almost the same time as the imaging operation (transmission target image data) can be transmitted to the operated communication device 3. In other words, the image data desired by the user of the operated communication device 3 can surely be included in the respective transmitted image data.

Third Embodiment

Next, a third embodiment of the present invention will be explained.

In the following description, the same numeral numbers will be applied to same components and steps same as those in the above first embodiment and the detailed explanations thereof will be omitted or simplified.

In the above first embodiment, when the sequential transmission operation is executed (steps S102 to S107 are repeatedly executed), the imaging device 2 selects a communication device 3 as a transmission destination and then selects the newest resized image data as image data to be transmitted to the communication device 3.

Compared to this, when the sequential transmission operation is executed, an imaging device according to the third embodiment selects, as image data to be transmitted to a communication device 3 as a transmission destination, transmission target image data selected according to a still image transmission request from another communication device 3 other than the destination communication device 3 or highly-evaluated resized image data if a predetermined mode is set in the imaging device.

Hereinafter, a structure of an imaging device 2B constituting an imaging system 1B according to the third embodiment will be explained. Here, the plural communication devices 3 constituting the imaging system 1B have the same structure as that of the communication device 3 explained in the above first embodiment, those explanations will be omitted.

Structure of Imaging Device

Figure 12:
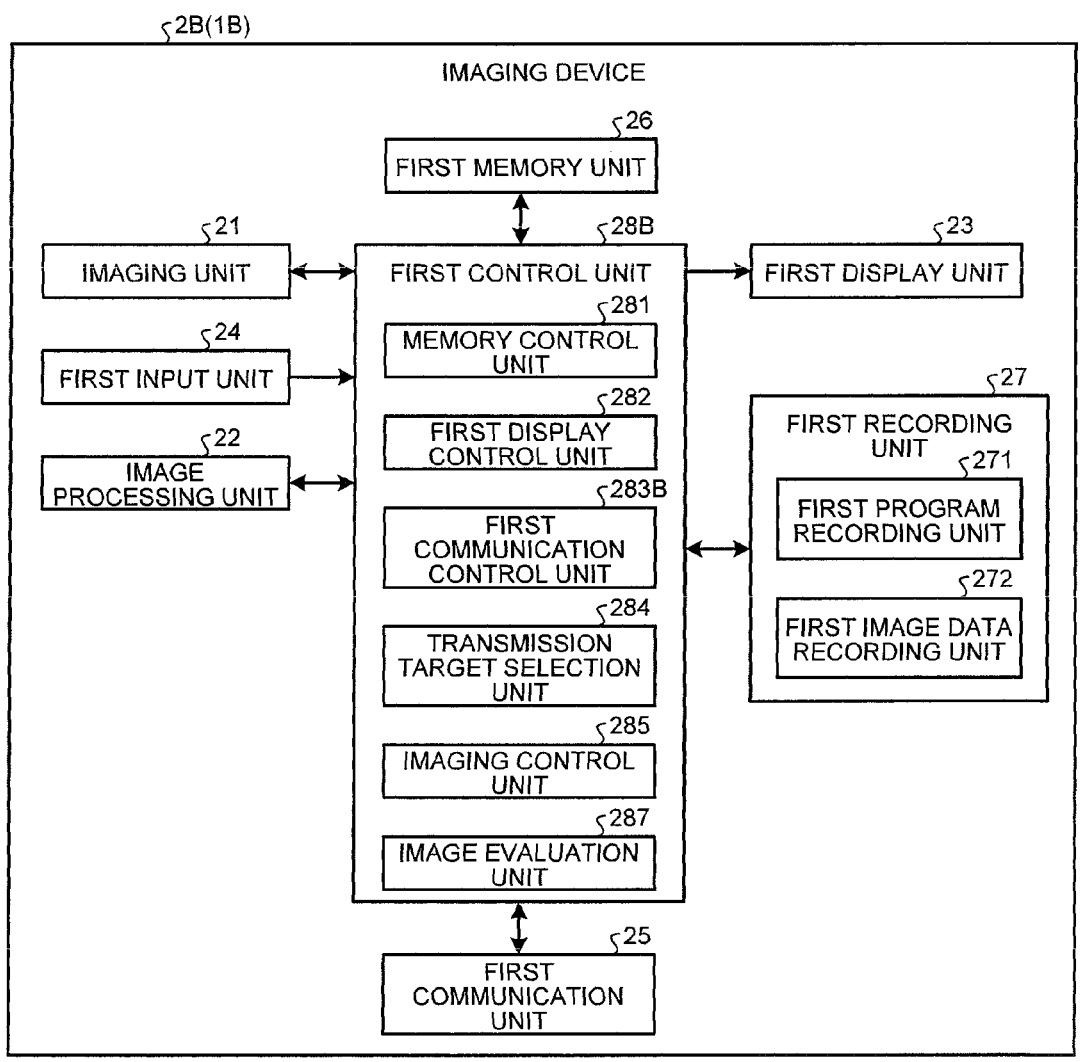
FIG. 12 is a block diagram illustrating a structure of an imaging device according to a third embodiment of the present invention.

FIG. 12 is a block diagram illustrating a structure of the imaging device 2B according to the third embodiment of the present invention.

As illustrated in FIG. 12, in a first control unit 28B constituting the imaging device 2B according to the third embodiment, an image evaluation unit 287 is added, compared to the imaging device 2 (FIG. 2) explained in the first embodiment.

When the imaging device 2B is set as a "best shot mode," the image evaluation unit 287 executes a predetermined function.

Here, the "best shot mode" is a mode set by an operation on the first input unit 24 by the user of the imaging device 2B and, in the sequential transmission operation, is a mode to transmit, to the communication device 3 as a transmission destination, transmission target image data selected according to the still image transmission request from another communication device 3 and highly-evaluated resized image data.

Then, the image evaluation unit 287 generates an evaluation value by analyzing plural pieces of resized image data stored in the first memory unit 26 and selects resized image data having a high evaluation value as image data to be transmitted to the communication device 3 as a transmission destination.

For example, the image evaluation unit 287 detects a position of the subject image, which is included in the resized image data, in an image region and generates a higher evaluation value which represents resized image data with a better composition having the subject image placed closer to the center of the image region.

Here, the evaluation value by the image evaluation unit 287 is not limited to the above evaluation value considering the composition and may be generated considering a condition of AF (Auto Focus) or a condition of AE (Auto Exposure) when captured, for example (See Japanese Patent Application Laid-open No. 2010-252078, for example).

Then, in a first communication control unit 283B according to the third embodiment, a change is applied to a part of the function of the first communication control unit 283 explained in the above first embodiment, in association with the addition of the image evaluation unit 287.

Operation of Imaging Device

Next, an operation of the imaging device 2B according to the third embodiment will be explained.

Here, since the operation of the plural communication devices 3 according to the third embodiment is the same as the operation of the communication device 3 explained in the above first embodiment (FIG. 5), the explanation thereof will be omitted.

Figure 13:
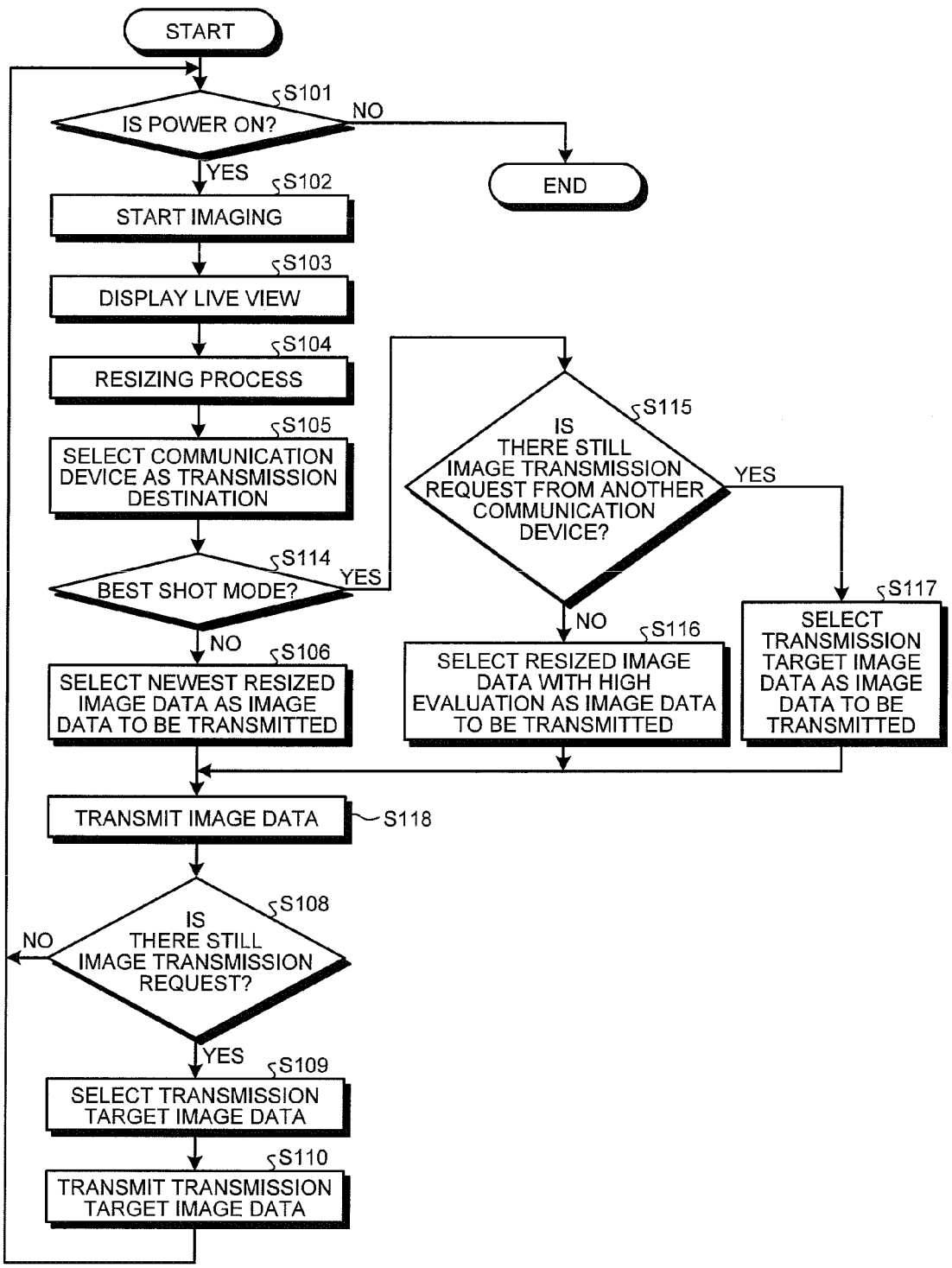
FIG. 13 is a flowchart illustrating an operation of the imaging device illustrated in FIG. 12.

FIG. 13 is a flowchart illustrating an operation of the imaging device 2B.

As illustrated in FIG. 13, the operation of the imaging device 2B according to the third embodiment has a structure which has only difference that steps S114 to S117 are added and step S118 is added in place of step S107, compared to the operation of the imaging device 2 explained in the above first embodiment (FIG. 4).

Thus, in the following, only steps S114 to S118 will be explained.

Step S114 is executed after step S105.

Concretely, in step S114, the first control unit 28B determines whether or not the imaging device 2B is set in the "best shot mode."

When it is determined that the imaging device 2B is not set in the "best shot mode" (step S114: No), the imaging device 2B proceeds to step S106.

On the other hand, when it is determined that the imaging device 2B is set in the "best shot mode" (step S114: Yes), the first communication control unit 283B determines whether or not a still image transmission request has been received, via the first communication unit 25, from another communication device 3 other than the communication device 3 selected in step S105 (step S115).

When it is determined that a still image transmission request has not been received from the another communication device 3 (step S115: No), the image evaluation unit 287 selects resized image data to be transmitted to the communication device 3 as a transmission destination selected in step S105 as described below (step S116).

Concretely, based on respective time stamps associated with plural pieces of resized image data stored in the first memory unit 26, the image evaluation unit 287 reads resized image data generated after the last resized image data transmitted to the communication device 3 selected in step S105 among the plural pieces of resized image data. Then, the image evaluation unit 287 generates an evaluation value by analyzing the read resized image data and selects resized image data having a high evaluation value as resized image data to be transmitted to the communication device 3 selected in step S105.

On the other hand, when it is determined that a still image transmission request has been received from the another communication device 3 (step S115: Yes), the first communication control unit 283B selects transmission target image data selected in step S109 in response to the still image transmission request from the another communication device 3 as resized image data to be transmitted to the communication device 3 selected in step S105 (step S117).

After step S106, step S116, or step S117, the first communication control unit 283B transmits resized image data (including a time stamp) selected in step S106, step S116, or step S117 to the communication device 3 selected in step S105 via the first communication unit 25 (step S118). After this, the imaging device 2B proceeds to step S108.

Here, for the sake of convenience in description, FIG. 13 illustrates that steps S104 to S106 and S114 to S118 are executed after step S103; however, step S103 and steps S104 to S106 and S114 to S118 are executed at substantially the same time.

Illustrative Example of Imaging Situation and Communication

In order to explain the operation of the above explained imaging system 1B in further detail, an illustrative example of an imaging situation of the imaging device 2B and communication executed by the imaging system 1B in the imaging situation will be explained.

Here, in the following, a sequential transmission operation different from the above first embodiment (operation for repeating steps S102 to S106 and S114 to S118) will mainly be explained.

Figure 14:
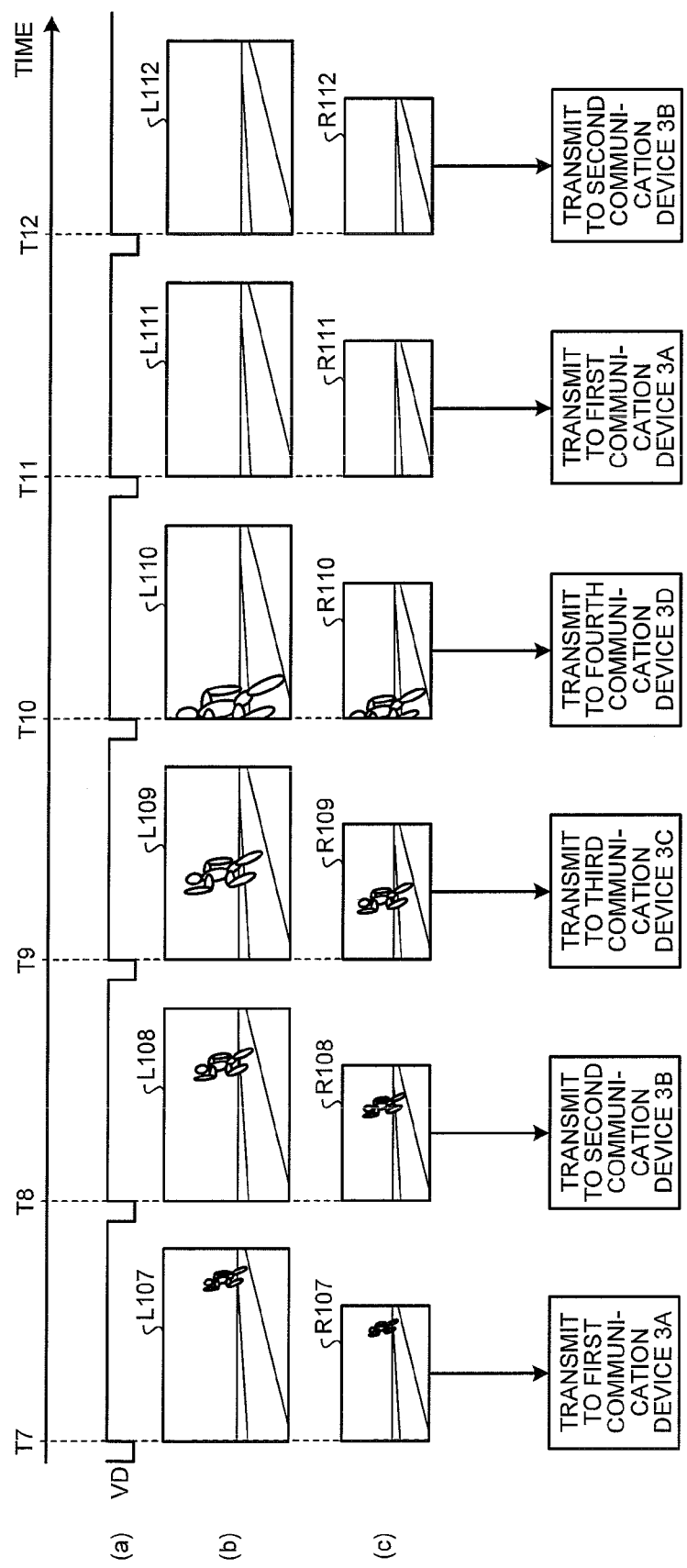
FIG. 14 is a diagram illustrating an example of timings of transmitting image data to be transmitted from the imaging device to first to fourth communication devices.
Figure 15:
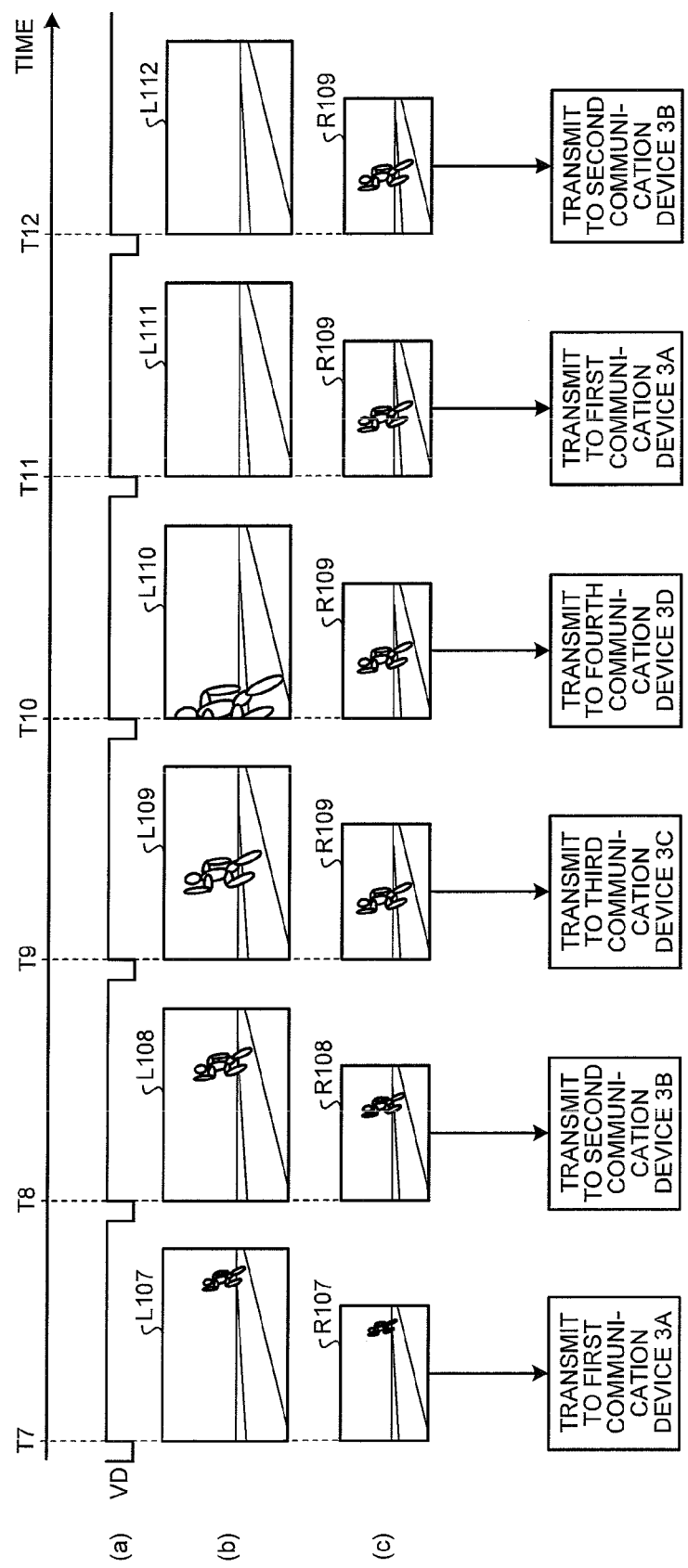
FIG. 15 is a diagram illustrating an example of timings of transmitting image data to be transmitted from the imaging device to the first to fourth communication devices.

FIGS. 14 and 15 are diagrams illustrating transmission timings of image data to be transmitted from the imaging device 2B to the first to fourth communication devices 3A to 3D.

Concretely, (a) in FIG. 14 and (a) in FIG. 15 illustrate a vertical synchronizing signal VD. (b) in FIG. 14 and (b) in FIG. 15 illustrate live view images L107 to L112 which are sequentially displayed on the imaging device 2B. (c) in FIG. 14 and (c) in FIG. 15 illustrate resized images R107 to R112 (only resized images R107 to R109 in (c) in FIG. 15)

corresponding to resized image data transmitted from the imaging device 2B to the first to fourth communication devices 3A to 3D.

The resized images R107 to R112 are images created by performing a resizing process on the live view images L107 to L112, respectively.

Similarly to the first embodiment, as the imaging situation, an imaging situation to capture a subject of a child running in a school athletic meeting will be considered. In this case, the angle of view is fixed and, as illustrated in (b) in FIG. 14 or (b) in FIG. 15, the imaging device 2B sequentially displays live view images L107 to L112 in which the subject image of the running child shifts from the right side to the left side.

Here, as illustrated in FIG. 14 or 15, the live view images L107 to L112 are images sequentially captured by the imaging unit 21 in synchronization with the vertical synchronizing signal VD. In more detail, the live view image L107 is an image captured at time T7 and time stamp $T_7$ is associated thereto. Similarly, the live view images L108 to L112 are images captured respectively at times T8 to T12 and time stamps $T_8$ to $T_{12}$ are associated thereto respectively.

It will be considered a case that the imaging device 2B and four communication devices 3 of the first to fourth communication devices 3A to 3D execute communication in the above described imaging situation.

When the "best shot mode" is not set (step S114: No), the imaging device 2B sequentially and repeatedly transmits the newest resized image data to the first to fourth communication devices 3A to 3D by executing the sequential transmission operation (repeatedly executing steps S102 to S106, S114, and S118). It is noted that the "newest" means the latest data as possible regarding the system responsiveness and the like, and may not actually be the newest data in some designs.

As a result, as illustrated in FIG. 14, the imaging device 2B transmits resized image data (including time stamp $T_7$) corresponding to the resized image R107 and resized image data (including time stamp $T_{11}$) corresponding to the resized image R111 to the first communication device 3A. Further, the imaging device 2B transmits resized image data (including time stamp $T_8$) corresponding to the resized image R108 and resized image data (including time stamp $T_{12}$) corresponding to the resized image R112 to the second communication device 3B. Further, the imaging device 2B transmits resized image data (including time stamp $T_9$) corresponding to the resized image R109 to the third communication device 3C. Further, the imaging device 2B transmits resized image data (including time stamp $T_{10}$) corresponding to resized image R110 to the fourth communication device 3D.

On the other hand, when the "best shot mode" is set (step S114: Yes) and a still image transmission request has been received from the another communication device 3 other than the communication device 3 selected in step S105 (step S115: Yes), the imaging device 2B transmits later described resized image data to the first to fourth communication devices 3A to 3D by executing the sequential transmission operation (repeatedly executing steps S102 to S105, S114, S115, S117, and S118).

Here, it will be considered a case that the user of the third communication device 3C performs an imaging operation with the third communication device 3C, the imaging device 2B receives a still image transmission request from the third communication device 3C serving as the operated communication device, and the resized image data (resized image R109) is selected as transmission target image data in step S109.

In this case, at times T10 to T12, the imaging device 2B receives a still image transmission request from the third communication device 3C other than the fourth communication device 3D, the first communication device 3A, and the second communication device 3B as transmission destinations (step S115: Yes). Thus, as illustrated in FIG. 15, at times T10 to T12, the imaging device 2B transmits selected resized image data (resized image R109) corresponding to the still image transmission request from the third communication device 3C, not the resized images R110 to R112 illustrated in FIG. 14, to the fourth communication device 3D, the first communication device 3A, and the second communication device 3B respectively (steps S117 and S118).

Here, while the fourth communication device 3D, the first communication device 3A, and the second communication device 3B are displaying the resized image R109, when an imaging operation is executed by the user of the communication device 3 which is one of the fourth communication device 3D, the first communication device 3A, and the second communication device 3B (when a still image transmission request is transmitted to the imaging device 2B), the imaging device 2B receives the still image transmission request from the communication device 3 (step S108: Yes), then selects, as transmission target image data, the resized image data (resized image R109) which is last transmitted to the communication device 3 in steps S109 and S110 and transmits the data to the communication device 3.

Here, there is omitted in the figure a case that the "best shot mode" is set (step S114: Yes) and a still image transmission request has not been received from the another communication device 3 other than the communication device 3 selected in step S105 (step S115: No); however, later described resized image data can be transmitted to the first to fourth communication devices 3A to 3D by executing the sequential transmission operation (repeatedly executing steps S102 to S105, S114 to S116, and S118).

For example, live view images L111 and L112 (resized images R111 and R112) captured at times T11 and T12 are images which do not include the subject image (see FIGS. 14 and 15). Thus, the imaging device 2B analyzes resized image data (resized images R107 to R111) generated after the resized image data (resized image R107) which is transmitted to the first communication device 3A last (time T7) and selects resized image data (resized image R109) having a high evaluation value (with a good composition) (step S116) as resized image data to be transmitted to the first communication device 3A at time T11. Further, regarding the resized image data to be transmitted to the second communication device 3B at time T12, the imaging device 2B selects resized image data (resized image R109) having a high evaluation value (step S116). Then, at times T11 and T12, the imaging device 2B transmits the resized image data (resized image R109) to the first and second communication devices 3A and 3B respectively (step S118), not the resized images R111 and R112 illustrated in FIG. 14.

According to the above explained third embodiment, the following effects can be obtained in addition to the same effects of the first embodiment.

In a case that the sequential transmission operation is executed, when the best shot mode is set (step S114: Yes) and a still image transmission request has not been received from the another communication device 3 other than the communication device 3 as a transmission destination (step S115: No), the imaging device 2B according to the third embodiment selects resized image data with high evaluation as image data to be transmitted to the communication device 3 (step S116). In other words, in the sequential transmission operation, when the composition of resized image data to be transmitted is poor (for example, when the subject image is not included), the imaging device 2B transmits resized image data having a good composition to the communication device 3 (step S118).

Thus, the communication device 3 can display only an image with a good composition without displaying an image without the subject image and this further improves its convenience.

Further, in a case that the sequential transmission operation is executed, when the best shot mode is set (step S114: Yes) and a still image transmission request has been received from the another communication device 3 other than the communication device 3 as the transmission destination (step S115: Yes), the imaging device 2B according to the third embodiment selects selection target image data selected according to the still image transmission request as data to be transmitted to the communication device 3 (step S117) and transmits the data to the communication device 3 (step S118).

Thus, the user of the communication device 3 can confirm, on the screen of the communication device 3, an image captured by the imaging device 2B at almost the same time as the imaging operation by the user of another communication device 3 and obtain image data related to the image. This further improves the convenience.

Modification Example of Third Embodiment

The above described third embodiment may have a structure that, when selection target image data selected according to the still image transmission request from the another communication device 3 is selected as the data to be transmitted to the communication device 3 as the transmission destination (step S117), the imaging device 2B transmits information that identifies the another communication device 3 to the communication device 3 in addition to the selection target image data. Further, it may have a structure that, in step S204, the communication device 3 displays the information that specifies the another communication device 3 (for example, a message such as "Image taken by Mr. XX" or the like) in addition to the image corresponding to the selection target image data.

With this structure, the user of the communication device 3 can recognize by whose imaging operation the displayed image (selection target image data) is captured.

Fourth Embodiment

Next, a fourth embodiment of the present invention will be explained.

In the following explanation, same numeral numbers will be applied to the components and steps same as those in the above first embodiment and the explanations thereof will be omitted or simplified.

In the above first embodiment, when executing the sequential transmission operation (steps S102 to S107 are repeatedly executed), the imaging device 2 selects the newest resized image data as image data to be transmitted to the communication device 3 after selecting the communication device 3 as the transmission destination.

On the other hand, in a case of executing the sequential transmission operation, when a still image transmission request has been received from another communication device 3 other than the communication device 3 as the transmission destination, the imaging device according to the fourth embodiment transmits, to the communication device 3 as the transmission destination, superimposed image data related to a superimposed image in which an image corresponding to transmission target image data selected according to the still image transmission request is superimposed on an image corresponding to the newest resized image data.

Hereinafter, a structure of an imaging device 2C constituting an imaging system 1C according to the fourth embodiment will be explained. Here, since the plural communication devices 3 constituting the imaging system 1C have a structure same as that of the communication device 3 explained in the above first embodiment, the explanation thereof will be omitted.

Structure of Imaging Device

Figure 16:
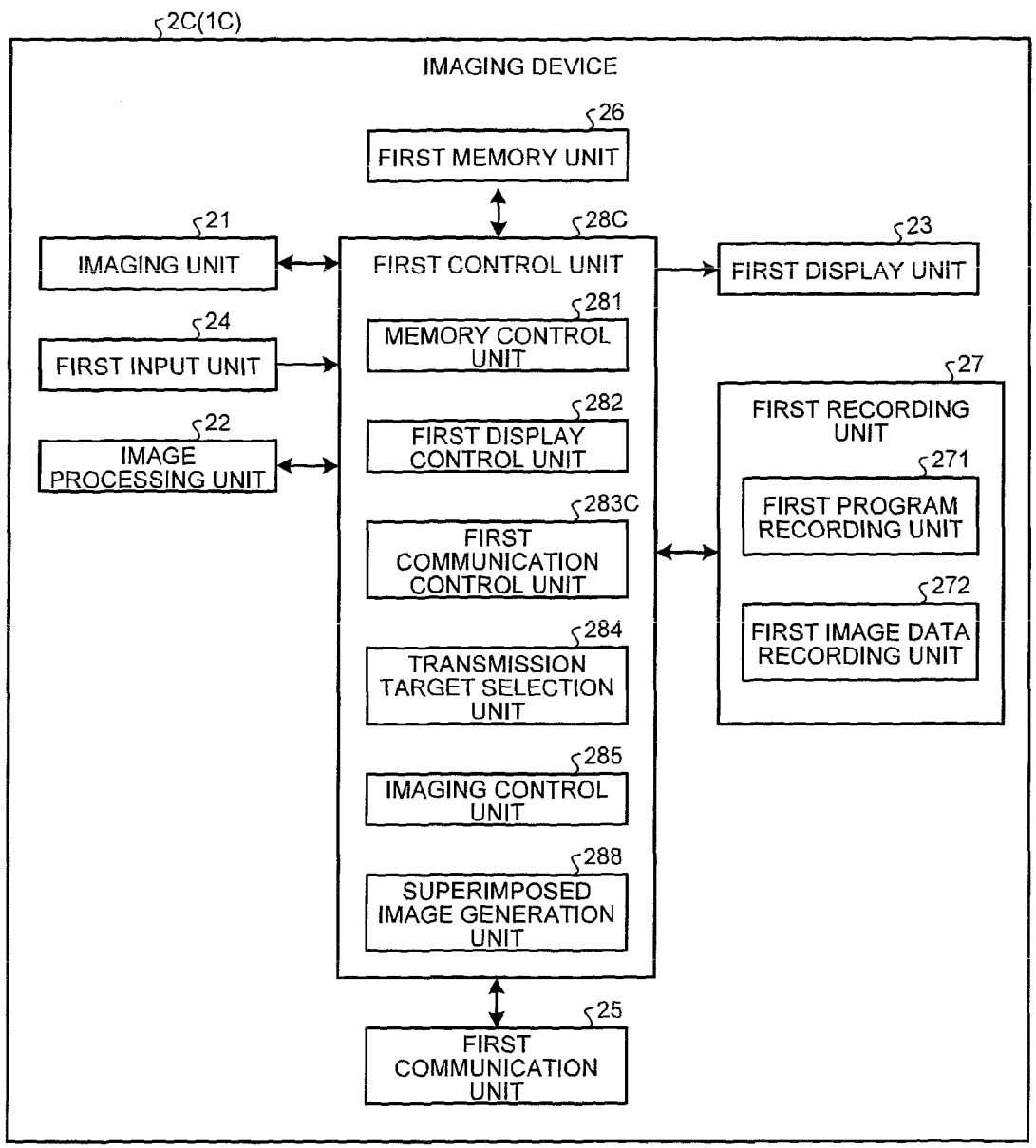
FIG. 16 is a block diagram illustrating a structure of an imaging device according to a fourth embodiment of the present invention.

FIG. 16 is a block diagram illustrating a structure of the imaging device 2C according to the fourth embodiment of the present invention.

As illustrated in FIG. 16, in a first control unit 28C constituting the imaging device 2C according to the fourth embodiment, a superimposed image generation unit 288 is added, compared to the imaging device 2 (FIG. 2) explained in the above first embodiment.

The superimposed image generation unit 288 generates superimposed image data related to a superimposed image in which an image corresponding to the transmission target image data selected by the transmission target selection unit 284 according to the still image transmission request is superimposed on an image corresponding to the newest resized image data. Here, the "newest" means the latest data as possible in consideration of the system responsiveness and the like and may not actually be the newest data in some designs. Further, considering user's response speed or the like, data shifted from the newest data may be used.

Then, a first communication control unit 283C according to the fourth embodiment has a structure in which a change is made to a part of the functions of the first communication control unit 283 explained in the above first embodiment, according to the addition of the superimposed image generation unit 288.

Operation of Imaging Device

Next, an operation of the imaging device 2C according to the fourth embodiment will be explained.

Here, since the operation of the plural communication devices 3 according to the fourth embodiment is the same as the operation of the communication device 3 (FIG. 5) explained in the above first embodiment, the explanations thereof will be omitted.

Figure 17:
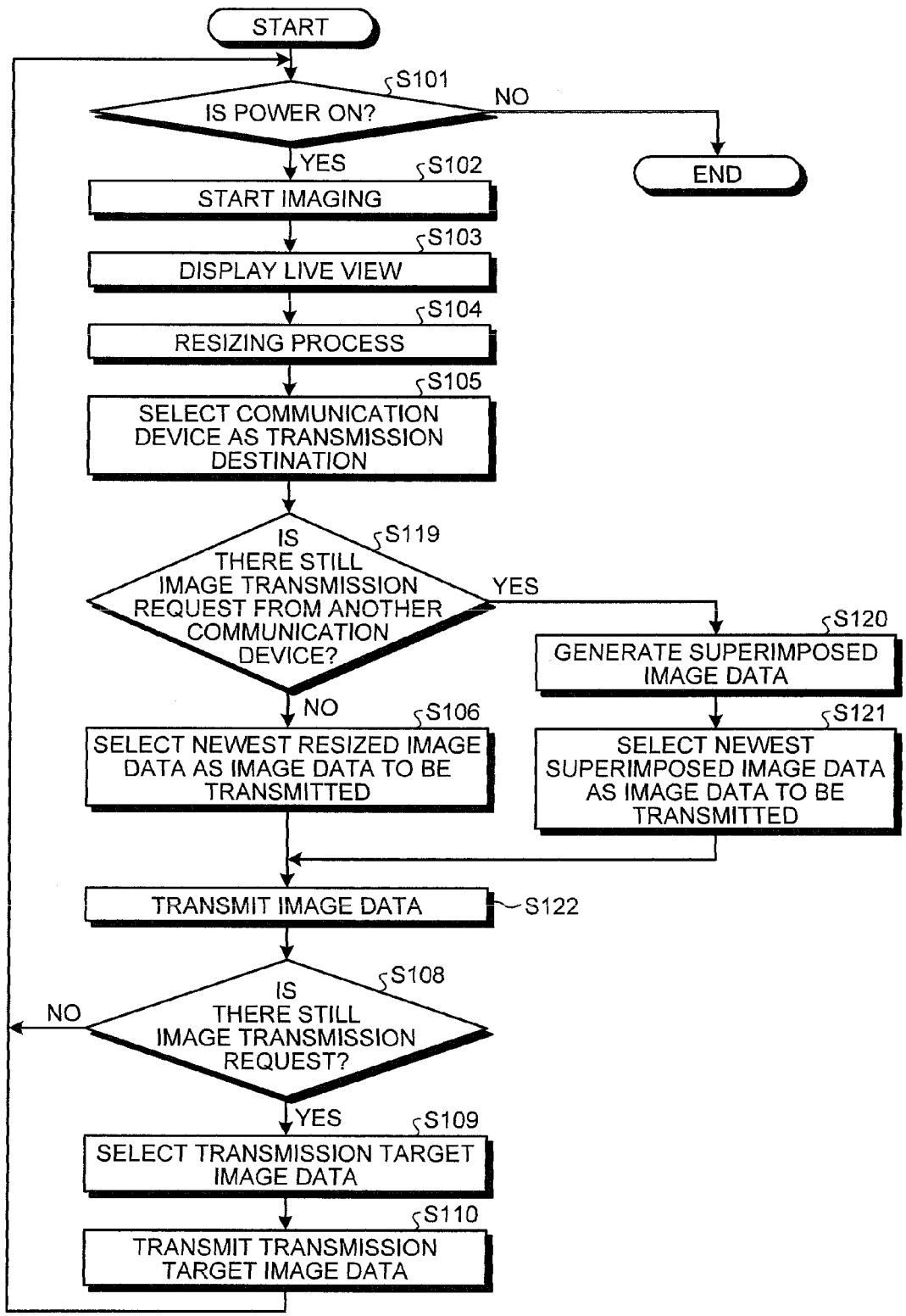
FIG. 17 is a flowchart illustrating an operation of the imaging device illustrated in FIG. 16.

FIG. 17 is a flowchart illustrating an operation of the imaging device 2C.

As illustrated in FIG. 17, the operation of the imaging device 2C according to the fourth embodiment has only difference that steps S119 to S121 are added and step S122 is added in place of step S107 in the operation of the imaging device 2 explained in the above first embodiment (FIG. 4).

Thus, only steps S119 to S122 will be explained below.

Step S119 is executed after step S105.

Concretely, the first communication control unit 283C determines whether or not a still image transmission request has been received from another communication device 3 other than the communication device 3 selected in step S105 via the first communication unit 25 (step S119).

When it is determined that a still image transmission request has not been received from the another communication device 3 (step S119: No), the imaging device 2C proceeds to step S106.

On the other hand, when it is determined that a still image transmission request has been received from the another communication device 3 (step S119: Yes), the superimposed image generation unit 288 generates superimposed image data related to a superimposed image in which an image corresponding to transmission target image data selected in step S109 in response to the still image transmission request from the another communication device 3 is superimposed on the image corresponding to the newest resized image data (step S120).

Next, the first communication control unit 283C selects the newest superimposed image data (superimposed image data including an image corresponding to the newest resized image data) as image data to be transmitted to the communication device 3 selected in step S105 (step S121).

After step S106 or S121, the first communication control unit 283C transmits resized image data (including a time stamp) or superimposed image data (including a time stamp) selected in step S106 or S121 to the communication device 3 selected in step S105 via the first communication unit (step S122). After that, the imaging device 2C proceeds to step S108.

Here, for the sake of convenience in description, FIG. 17 illustrates that steps S104 to S106 and S119 to S122 are executed after step S103; however, steps S104 to S106 and S119 to S122 are executed actually at substantially the same time as step S103.

Illustrative Example of Imaging Situation and Communication

In order to explain the operation of the above explained imaging system 1C in further detail, an illustrative example of an imaging situation of the imaging device 2C and communication executed by the imaging system 1C in the imaging situation will be explained.

Here, a sequential transmission operation (an operation to repeat steps S102 to S106 and S119 to S122) which is different from that in the above first embodiment will be explained.

Figure 18:
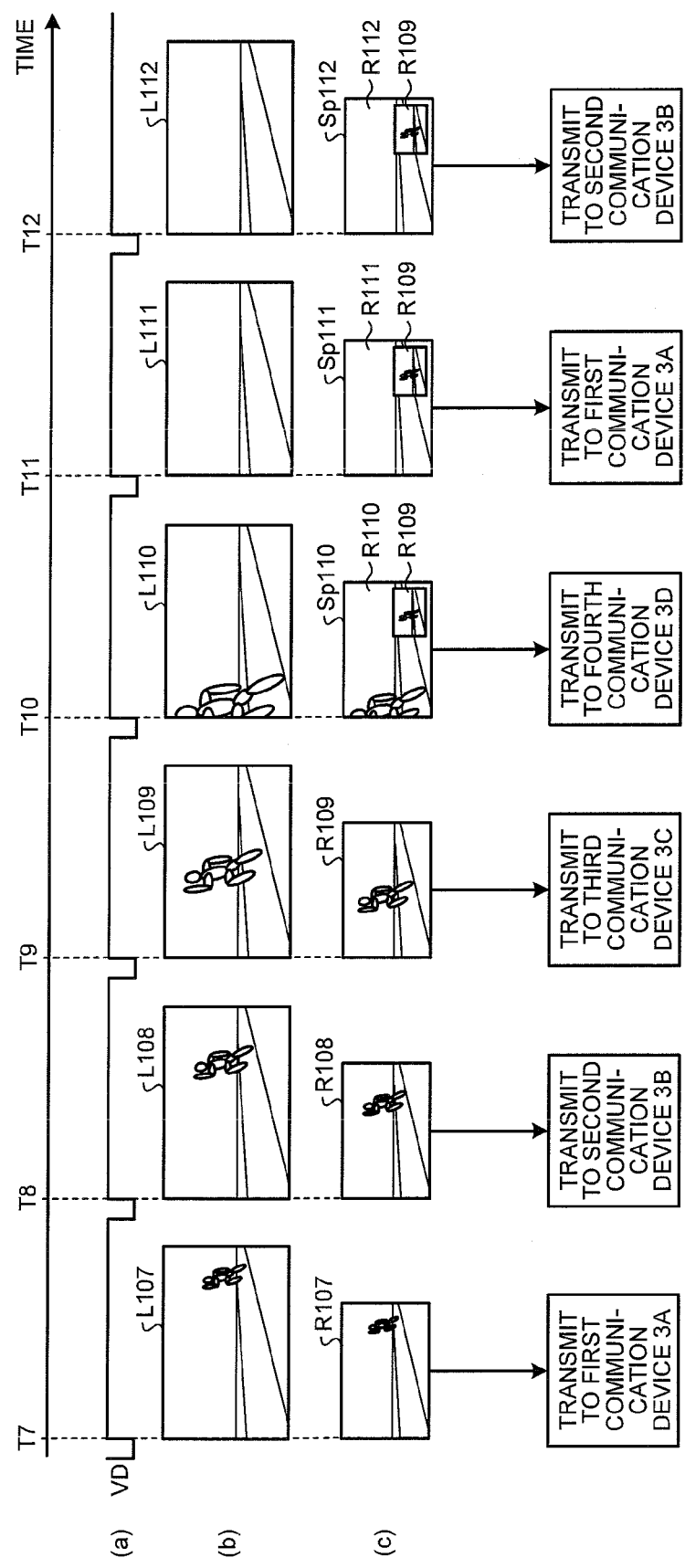
FIG. 18 is a diagram illustrating an example of timings of transmitting image data to be transmitted from the imaging device to first to fourth communication devices when a still image transmission request is received from one communication device.

FIG. 18 is a diagram illustrating an example of transmission timings of image data to be transmitted to the first to fourth communication devices 3A to 3D from the imaging device 2C.

Concretely, (a) in FIG. 18 and (b) in FIG. 18 are the same diagrams as (a) in FIG. 14 and (b) in FIG. 14 ((a) in FIG. 15 and (b) in FIG. 15). (c) in FIG. 18 illustrates resized images R107 to R109 corresponding to the resized image data and superimposed images Sp110 to Sp112 corresponding to the superimposed image data, to be transmitted to the first to fourth communication devices 3A to 3D from the imaging device 2C.

As an imaging situation, an imaging situation same as the imaging situation explained in the above third embodiment will be considered. Further, in such an imaging situation, similarly to the above third embodiment, a case that communication is executed between the imaging device 2C and the four communication devices 3 of the first to fourth communication devices 3A to 3D will be considered.

When a still image transmission request has not been received from the another communication device 3 other than the communication device 3 selected in step S105 (step S119: No), the imaging device 2C sequentially and repeatedly transmits the newest resized image data to the first to fourth communication devices 3A to 3D by executing the sequential transmission operation (repeatedly executing steps S102 to S106, S119, and S122) (see FIG. 14).

On the other hand, when a still image transmission request has been received from the another communication device 3 other than the communication device 3 selected in step S105 (step S119: Yes), the imaging device 2C transmits later described superimposed image data to the first to fourth communication devices 3A to 3D by executing the sequential transmission operation (repeatedly executing steps S102 to S105 and S119 to S122).

Here, it will be considered a case that the user of the third communication device 3C executes an imaging operation with the third communication device 3C, the imaging device 2B receives a still image transmission request from the third communication device 3C serving as the operated communication device, and resized image data (resized image R109) is selected as transmission target image data in step S109.

In this case, at times T10 to T12, the imaging device 2C receives a still image transmission request from the third communication device 3C other than the fourth communication device 3D, first communication device 3A, and second communication device 3B as transmission destinations (step S119: Yes). Thus, as illustrated in FIG. 18, at times T10 to T12, the imaging device 2C transmits respective pieces of superimposed image data related to superimposed images Sp110 to Sp112 in which a resized image R109 corresponding to the resized image data selected according to the still image transmission request from the third communication device 3C is superimposed on the resized images R110 to R112, not on the resized images R110 to R112 in FIG. 14, to the fourth communication device 3D, first communication device 3A, and second communication device 3B (steps S120 to S122) respectively.

Here, while the above superimposed images Sp110 to Sp112 are displayed on the fourth communication device 3D, first communication device 3A, and second communication device 3B, when an operation of "a request for transmission of resized image R109" is executed by at least one of the users of the communication devices 3 of the fourth communication device 3D, first communication device 3A, and second communication device 3B and a transmission request of the resized image R109 is transmitted from the communication device 3 to the imaging device 2C, the imaging device 2C transmits resized image data corresponding to the resized image R109 to the communication device 3. Then, the communication device 3 records the received resized image data (resized image R109) to the second image data recording unit 352.

According to the above explained fourth embodiment, the following effects will be achieved in addition to the same effects in the above first embodiment.

In a case of executing the sequential transmission operation, when a still image transmission request has been received from the another communication device 3 other than the communication device 3 as the transmission destination (step S119: Yes), the imaging device 2C according to the fourth embodiment selects, as image data to be transmitted to the communication device 3, superimposed image data related to the superimposed image in which an image corresponding to the transmission target image data is superimposed on the image corresponding to the newest resized image data (step S121) and transmits the data to the communication device 3 (step S122).

Thus, the user of the communication device 3 can confirm, on the screen of the communication device 3, the image captured by the imaging device 2C at almost the same time as the imaging operation by the user of the another communication device 3 and also obtain image data related to the image. This further improves the convenience.

Particularly, the user of the communication device 3 can confirm, on the screen of the communication device 3, an image corresponding to the newest resized image data in addition to the image captured by the imaging device 2C at almost the same as the imaging operation by the user of the another communication device 3. Thus, by performing an imaging operation on the communication device 3 at a preferred timing, the user of the communication device 3 can also obtain an image captured by the imaging device 2C at almost the same time as the imaging operation.

Modification Example of Fourth Embodiment

In the above fourth embodiment, when the newest superimposed image data (including an image corresponding to the selection target image data selected according to the still image transmission request from the another communication device 3) is selected as data to be transmitted to the communication device 3 as the transmission destination (step S121), the imaging device 2C may be made to transmit, with the superimposed image data, information for specifying the another communication device 3 to the communication device 3. Further, the communication device 3 may be made to display the information for specifying the another communication device 3 (for example, a message such as "Image captured by Mr. XX" or the like) as displaying the image corresponding to the superimposed image data in step S204.

With the above structure, the user of the communication device 3 can recognize by whose imaging operation the displayed image (selection target image data) is captured.

Other Embodiments

While the embodiments of the present invention have been explained above, the present invention is not limited to the above described first to fourth embodiments. Particularly, although expressions such as "the newest," "immediately before" and "immediately after" are used in the explanation, one at a timing shifted from the timings of the newest, immediately before, immediately after can be employed according to a system structure or performance, a software performance limitation, user's response speed and the like, within a scope of the present invention. Further, the image selection or the like is not strictly limited to corresponding one image and a plurality of images adjacent one another may be selected.

According to the first to fourth embodiments, time stamps related to the time when image data is generated are used as identification information of the present invention; however, it is not limited to this example and other information such as frame numbers of the image data or the like may be used as long as the information is used to identify the image data.

Further, the process flows are not limited to the order of the processes in the flowcharts explained in the first to fourth embodiments and modifications can be made in a consistent manner.

Further, an algorithm of the processes explained using the flowcharts in this specification can be written as a program. This program may be recorded in a record unit in a computer or recorded in a recording medium which is readable by a computer. The recording of the program in a record unit or a recording medium may be executed before the computers or recording media are shipped as products or may be downloaded via a communication network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
an imaging unit configured to sequentially capture images of a subject and generate plural pieces of image data;
a storing unit configured to store the plural pieces of image data generated by the imaging unit;
a first communication unit configured to be connected to plural communication devices to transmit and receive information thereto and therefrom;
a first communication control unit configured to sequentially transmit a newest one of the plural pieces of image data and identification information for identifying the newest one of the plural pieces of image data to the plural communication devices via the first communication unit and receive the identification information received by an operated communication device and elapsed time information from the operated communication device via the first communication unit, the operated communication device being one of the plural communication devices that a user performs an imaging operation, and the elapsed time information being related to elapsed time from a reception of the newest one of the plural pieces of image data and the identification information by the operated communication device until an execution of the imaging operation on the operated communication device; and
an image selection unit configured to select reproduction priority candidate image data, which is obtainable and reproducible by the operated communication device, from among the plural pieces of image data stored in the storing unit based on the elapsed time information and the identification information received via the first communication unit.

2. The imaging device according to claim 1, wherein when the reproduction priority candidate image data is selected by the image selection unit, the first communication control unit transmits the reproduction priority candidate image data to the operated communication device via the first communication unit.

3. The imaging device according to claim 1, further comprising
a memory control unit configured to associate each of the plural pieces of image data generated by the imaging unit with each of plural pieces of time information related to the time when each of the plural pieces of image data is generated and store the plural pieces of image data and the plural pieces of time information in the storing unit,
wherein the identification information is time information associated with the newest one of the plural pieces of image data among the plural pieces of time information.

4. The imaging device according to claim 1, further comprising:
a memory control unit configured to associate each of the plural pieces of image data generated by the imaging unit with each of plural pieces of time information related to the time when each of the plural pieces of image data is generated and store the plural pieces of image data and the plural pieces of time information in the storing unit; and
a change amount calculation unit configured to read the reproduction priority candidate image data and image data from among the plural pieces of image data stored in the storing unit based on the plural pieces of time information and calculate a change amount of a subject image included in the reproduction priority candidate image data and the image data, the image data being generated immediately before or immediately after the reproduction priority candidate image data in time series among the plural pieces of image data, wherein, when the change amount calculated by the change amount calculation unit is equal to or greater than a certain threshold value, the first communication control unit reads image data generated within a certain period of time including the time when the reproduction priority candidate image data is generated from among the plural pieces of image data stored in the storing unit based on the plural pieces of time information and transmits image data generated within the certain period of time to the operated communication device.

5. The imaging device according to claim 4, wherein the certain period of time is a period of time from the time when the newest one of plural pieces of image data which is specified based on the identification information received from the operated communication device via the first communication unit is generated until the time when the reproduction priority candidate image data is generated.

6. The imaging device according to claim 1, wherein when the reproduction priority candidate image data is selected by the image selection unit, the first communication control unit transmits the reproduction priority candidate image data to all of the plural communication devices including the operated communication device via the first communication unit.

7. The imaging device according to claim 1, further comprising a superimposed image generation unit configured to sequentially generate plural pieces of superimposed image data every time each of the plural pieces of image data is generated by the imaging unit, when the reproduction priority candidate image data is selected by the image selection unit, each of the plural pieces of superimposed image data being related to each of superimposed images in which an image corresponding to the reproduction priority candidate image data is superimposed on each of images corresponding to the plural pieces of image data generated by the imaging unit, wherein, when the reproduction priority candidate image data is selected by the image selection unit, the first communication control unit transmits the reproduction priority candidate image data to the operated communication device via the first communication unit and sequentially transmits a newest one of the plural pieces of superimposed image data generated by the superimposed image generation unit and the identification information to another communication device except for the operated communication device among the plural communication devices.

8. An imaging system comprising:
the imaging device according to claim 1; and
plural communication devices configured to be connected to the imaging device to transmit and receive information thereto and therefrom,
wherein the communication device including:
a second communication unit configured to be connected to the imaging device to transmit and receive information thereto and therefrom;
a second communication control unit configured to receive the newest one of the plural pieces of image data and the identification information from the imaging device via the second communication unit;
a display unit configured to display an image;
a display control unit configured to control the display unit to display an image corresponding to the newest one of the plural pieces of image data received from the imaging device via the second communication unit;
an operation accepting unit configured to accept the imaging operation; and
an elapsed time measuring unit configured to measure elapsed time from a reception of the newest one of the plural pieces of image data and the identification information from the imaging device via the second communication unit until an acceptance of the imaging operation by the operation accepting unit,
wherein, when the operation accepting unit accepts the imaging operation, the second communication control unit transmits elapsed time information related to the elapsed time measured by the elapsed time measuring unit and the identification information to the imaging device via the second communication unit.

9. A communication device that is connected to an imaging device for capturing an image of a subject to transmit and receive information thereto and therefrom, the communication device comprising:
a second communication unit configured to be connected to the imaging device to transmit and receive information thereto and therefrom;
a second communication control unit configured to receive image data and identification information for identifying the image data from the imaging device via the second communication unit;
a display unit configured to display an image;
a display control unit configured to control the display unit to display an image corresponding to the image data received from the imaging device via the second communication unit;
an operation accepting unit configured to accept an imaging operation; and
an elapsed time measuring unit configured to measure elapsed time from a reception of the image data and the identification information from the imaging device via the second communication unit until an acceptance of the imaging operation by the operation accepting unit,
wherein, when the operation accepting unit accepts the imaging operation, the second communication control unit transmits elapsed time information related to the elapsed time measured by the elapsed time measuring unit and the identification information to the imaging device via the second communication unit.

10. An imaging method executed by an imaging device that is connected to plural communication devices to transmit and receive information thereto and therefrom, the imaging method comprising:
generating plural pieces of image data by sequentially capturing images of a subject;
sequentially transmitting a newest one of the plural pieces of image data and identification information for identifying the newest one of the plural pieces of image data to the plural communication devices;
receiving the identification information received by an operated communication device and elapsed time information from the operated communication device, the operated communication device being one of the plural communication devices that a user performs an imaging operation, and the elapsed time information being related to elapsed time from a reception of the newest one of the plural pieces of image data and the identification information by the operated communication device until an execution of the imaging operation on the operated communication device; and selecting reproduction priority candidate image data, which is obtainable and reproducible by the operated communication device, from among the plural pieces of the image data stored in storing unit based on the elapsed time information and the identification information received.

11. A non-transitory computer readable recording medium having an executable program recorded thereon, the program instructing a processor, which is included in an imaging device that is connected to plural communication devices to transmit and receive information thereto and therefrom, to execute:

generating plural pieces of image data by sequentially capturing images of a subject;

sequentially transmitting a newest one of the plural pieces of image data and identification information for identifying the newest one of the plural pieces of image data to the plural communication devices;

receiving the identification information received by an operated communication device and elapsed time information from the operated communication device, the operated communication device being one of the plural communication devices that a user performs an imaging operation, and the elapsed time information being related to elapsed time from a reception of the newest one of the plural pieces of image data and the identification information by the operated communication device until an execution of the imaging operation on the operated communication device; and selecting reproduction priority candidate image data, which is obtainable and reproducible by the operated communication device, from among the plural pieces of the image data stored in storing unit based on the elapsed time information and the identification information received.

* * * * *